United States Patent [19]

Lubarsky

[11] Patent Number: 4,899,340
[45] Date of Patent: Feb. 6, 1990

[54] ERROR CORRECTING CODE AND ERROR CORRECTING CIRCUIT USING THE SAME

[75] Inventor: Daniel P. Lubarsky, San Jose, Calif.

[73] Assignee: Pacific Bell, San Francisco, Calif.

[21] Appl. No.: 212,601

[22] Filed: Jun. 28, 1988

[51] Int. Cl.⁴ ............................................. G06F 11/10
[52] U.S. Cl. .................................... 371/37.1; 371/47.1
[58] Field of Search ........................ 371/37, 38, 39, 40, 371/42, 47, 37.1, 47.1

[56] References Cited

U.S. PATENT DOCUMENTS

| | | | |
|---|---|---|---|
| 3,398,400 | 8/1968 | Rupp et al. | 371/42 |
| 3,471,830 | 10/1969 | McRae et al. | 371/47 |
| 3,860,908 | 1/1975 | Stratton, III | 371/51 |
| 4,377,863 | 3/1983 | Legory et al. | 371/42 |
| 4,473,902 | 9/1984 | Chen | 371/37 |
| 4,509,172 | 4/1985 | Chen | 371/38 |
| 4,567,594 | 1/1986 | Deodhar | 371/38 |
| 4,569,050 | 2/1986 | Ohme | 371/37 |
| 4,680,765 | 7/1987 | Doland | 371/42 |
| 4,682,333 | 6/1987 | Onishi et al. | 371/39 |

OTHER PUBLICATIONS

Dunbar, B. J., et al., "Dataport–Channel Units for Digital Data System 56–kb/s Rate", *The Bell System Technical Journal*, vol. 61, No. 9, Nov. 1982, pp. 2741–2756.

Primary Examiner—Charles E. Atkinson
Attorney, Agent, or Firm—McCubbrey, Bartels, Meyer & Ward

[57] ABSTRACT

An improved error correcting circuit that is adapted for correcting errors in data to be transmitted over communication links which require a minimum density of 1's to preserve timing on the transmission link is described. The circuit utilizes an error correcting code which converts a data word into two encoded words. Neither of the encoded data words is 0 for any of the possible values of the data word.

9 Claims, 4 Drawing Sheets

ERROR CORRECTING CODE AND ERROR CORRECTING CIRCUIT USING THE SAME

BACKGROUND OF THE INVENTION

The present invention relates to data transmission over error prone transmission lines and, more particularly, to error correcting codes that must include a minimum number of "1" bits in each encoded data word.

There is an increasing demand for high speed digital data transmission within existing telephone facilities. To provide increased digital data transmission, the existing T-carrier facilities have been modified to carry digital data. The T-carrier facilities provide a means for transmitting digital data from a plurality of sources over a single time domain multiplexed transmission link. In a T-carrier system, data streams from a number of channels at a first station are combined into a single time domain multiplexed data stream which is transmitted to a second station where the data is demultiplexed back into separate data streams.

The transmission link between the two stations includes repeaters for correcting for line losses. These repeaters must be synchronized with circuitry in the two stations. This synchronization is maintained by utilizing transitions between "1" and "0" bits to correct timing errors. This method of correcting timing errors places constraints on the data transmitted which will be discussed in more detail below.

Unfortunately, the existing facilities do not always have the transmission quality to allow data to be transmitted with an acceptable error rate. For example, attempts have been made to utilize the existing T-carrier facilities and lines for transmitting high speed data. The T-carrier lines are designed and engineered for a bit error rate of approximately one error in a thousand for 95 percent of the systems. Although this is adequate for voice grade services, it is insufficient for data services which typically require an error rate of one error in 100 million.

One method of improving the error rate of the existing T-carrier facilities is to encode the data using an error correcting code before transmitting it over the T-carrier lines. For the purposes of this discussion, an error correcting code is most easily understood with reference to the transmission of data over an error prone transmission line. Assume that a first user wishes to transmit n-bit data words to a second user over an error prone transmission line. The first user generates data in n-bit data words. There are $2^n$ possible such data words. Prior to transmission, each data word is converted to an m-bit data word, which will be referred to as a transmission word. Here, it is assumed that $m > n$. At the other end of the transmission line, the received transmission words are converted back to data words.

Since there are more possible transmission words than data words, not every m-bit transmission word corresponds to a data word. For example, if $n = 8$ and $m = 16$, there are 256 possible data words. However, there are 65,536 possible transmission words. Only 256 of these transmission words correspond to the 256 possible data words. These transmission words will be referred to as legal transmission words. The remaining transmission words will be referred to as illegal transmission words. In an error free transmission system, none of the illegal transmission words would be received by the second user. However, if the transmission system is error prone, a legal transmission word can be converted to an illegal transmission word by a transmission error with changes the value of one or more bits in the transmitted data word.

An error correcting code will be defined to be a transformation for mapping each value of a data word onto the set of $2^n$ legal transmission words such that errors in transmission can be detected and corrected. That is, the value of the legal transmission word which was corrupted by transmission errors into a received illegal transmission word may be deduced from said illegal transmission word. This error correction is possible provided the number of errors introduced into the original legal transmission word is less than a predetermined number which depends on the code in question.

The ability of an error correcting code to correct errors is measured by a quantity referred to as the "Hamming Distance" associated with the code. For example, codes with a Hamming Distance of 5 can detect errors resulting from 4 single-bit errors in transmission and correct for all possible 2 single-bit errors. Error correcting codes of this type are well known to those skilled in the telephone and computer arts. A discussion of error correcting codes may be found in ERROR CORRECTING CODES, 2ND EDITION, by Peterson and Weldon, MIT PRESS, 1972, or in PRACTICAL ERROR DESIGN FOR ENGINEERS, by Neil Glover, Data Systems Technology Corp., 1982.

This type of error correction is utilized in T-carrier facilities to improve the effective transmission error rate. Typically, an 8-bit data word is first encrypted to form a 16-bit data word using an error correcting code. The 16-bit data word is then transmitted over the T-carrier lines. Since there are now twice as many bits to transmit, two "time slots" on the T-carrier lines must be used. That is, each 16-bit transmission word is divided into two 8-bit transmission words. The first such transmission word is transmitted on a first channel in the T-carrier and the second such transmission word is transmitted on a second channel. At the receiving end of the transmission line, the two 8-bit transmission words are recombined into a single 16-bit transmission word. This 16-bit transmission word is then decrypted at the far end of the T-carrier lines to produce the original 8-bit data word. The decryption process also corrects for most of the random bit errors.

One problem with this approach to reducing the error rate on the T-carrier lines is that all encrypted values of the original 8-bit data word do not have sufficient numbers of "1" bits in the 16-bit encrypted words to satisfy the timing constraints in the T-carrier system. As noted above, the T-carrier facilities include circuitry for repeating the data transmitted over long T-carrier lines. These circuits require that the signals being sent over the T-carrier lines include a minimum density of "1" bits, since transitions between "0" and "1" bits are used for recovering from timing errors. As a result, long strings of "0" bits interfere with synchronization.

In general, there must be at least one "1" bit in each group of 16 bits transmitted. As noted above, each data word is transformed into two transmission words which are transmitted on different time channels. Hence, a code that produced a transmission data word which was 16 zeros would be unacceptable if the two 8-bit transmission words were in adjacent time channels.

In addition, an error correcting code that produced one 8-bit transmission word that was all zeros would also be unacceptable. Consider a system in which four channels in the T-carrier are used for error correcting code encrypted data transmission corresponding to two different users, and assume that for a particular 8-bit data word, the first of the resulting 8-bit transmission words was all zeros. If the channels in question were assigned such that the first channel transmitted the first 8-bit transmission word of the first user and the second channel transmitted the first 8-bit transmission word of the second user, then 16 consecutive zeros would be present on the transmission line whenever both users transmitted the 8-bit data word in question at the same time.

In general, the time channels assigned to each of the 8-bit transmission words can not be predicted in advance. Hence, an error correcting code that produced an 8-bit transmission word that was all zeros would also be unacceptable.

Existing error correcting codes do not provide a suitable density of "1" bits. Error correcting codes that generate transmission words that include at least one 1 in each 16 bits are known. However, codes that guarantee at least one 1 in each of the 8-bit transmission words are not known to the prior art. That is, there is always at least one value for an 8-bit data word for which one of the corresponding 8-bit transmission words is all zeros.

In prior art systems, this problem is overcome by limiting the user to 7-bit data words. For example, if the eights bit of each 8-bit data word is a "1", then codes having sufficient numbers of bits containing ones in the 16-bit encrypted data words are known. The problem with this approach is that it reduces the effective Baud rate of the transmission line. If the 8th bit must always be a "1", then there are only 7 bits left to transmit real data. As a result, ⅛ of the capacity of the lines is lost. Hence, a T-carrier facility that has a maximum Baud rate of 64 Kbits/sec can only transmit 56 Kbits/sec of real data.

Broadly, it is an the object of the present invention to provide an improved data transmission system.

It is another object of the present invention to provide an error correcting code that provides sufficient density of "1" bits for timing recovery without restricting the data values transmitted and without reducing the error correcting ability of the code.

These and other objects of the present invention will become apparent to those skilled in the art from the following detailed description of the present invention and the accompanying drawings.

SUMMARY OF THE INVENTION

The present invention comprises an error correcting circuit for converting data to be sent over error prone communication lines that require a minimum density of 1 bits in the data transmitted thereon. An error correcting circuit according to the present invention includes circuitry for receiving an n-bit received digital word and circuitry for transmitting first and second transmission encrypted words. The first transmission encryped word has $n_1$ bits and the second transmission encrypted word has $n_2$ bits. The transmitting circuitry includes circuitry for encrypting the received digital word according to an error correcting code to form the first and second transmission encrypted words. The first and second transmission encrypted words generated by this circuitry are different from 0 for all possible values of said n-bit digital words. The invention also includes circuitry for receiving first and second reception encrypted words, the first reception encrypted word having $n_1$ bits and the second reception encrypted word having $n_2$ bits. The receiving circuitry includes circuitry for decrypting the first and second reception encrypted words using the error correcting code to form an n-bit transmitted digital word.

DETAILED DESCRIPTION OF THE INVENTION

Figure 1:
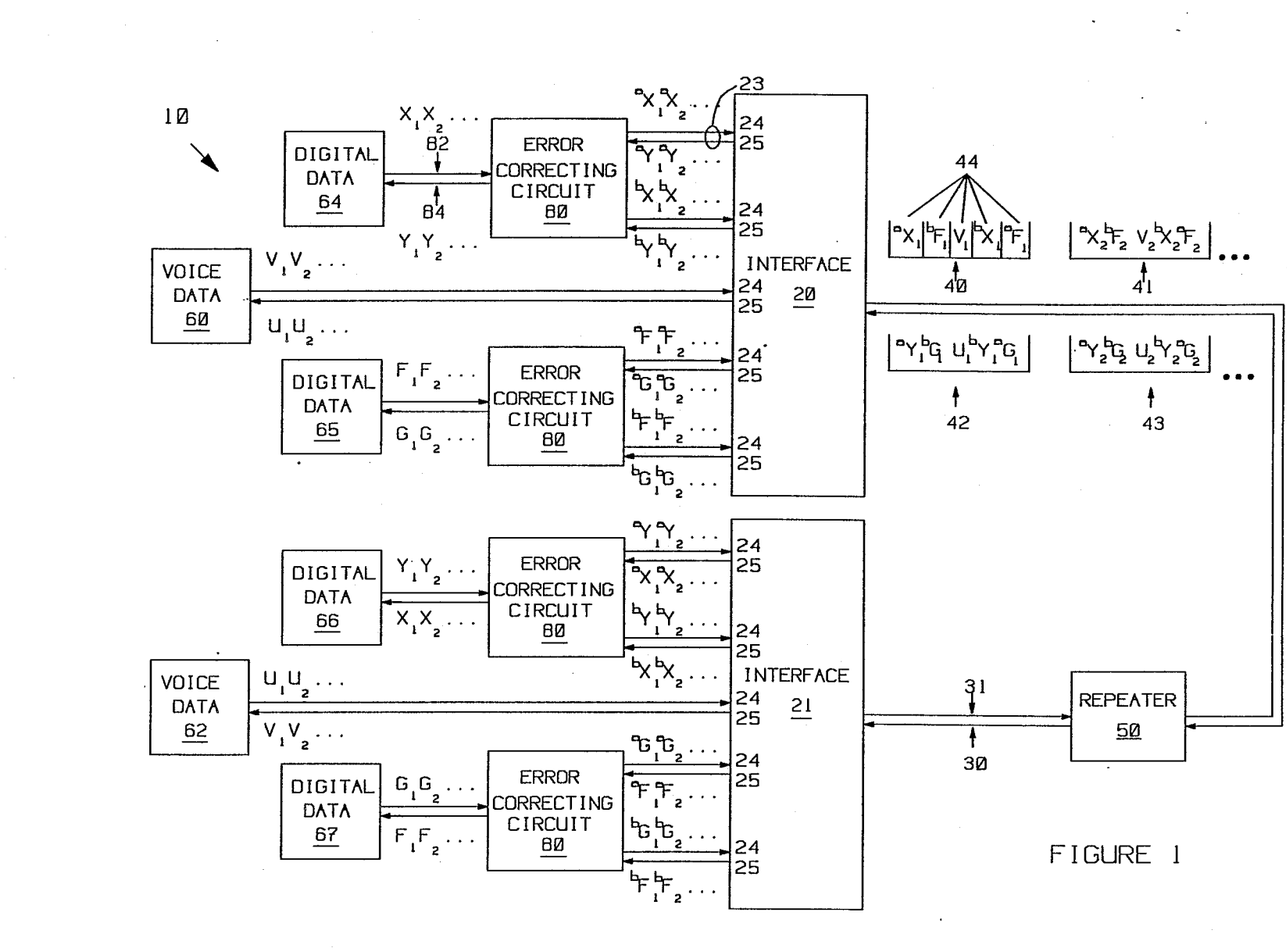
FIG. 1 is a block diagram of a T-carrier data transmission system.

The present invention may be most easily understood with reference to FIG. 1 which illustrates a typical data transmission system in which data is transmitted partially over T1 telephone transmission lines 30 and 31. The T1 facility 10 includes two interface units 20 and 21 which are connected by transmission lines 30 and 31. Each interface unit may receive and send data over a number of channels. Typical channels are shown at 23. Each channel consists of an input line 24 and an output line 25.

Each interface unit combines the digital data words on the various input lines 24 into a single time domain multiplexed stream of digital data. For example, interface unit 20 combines the individual data streams on input lines 24 into a single data stream which is transmitted on line 30. The data words are transmitted in "frames". Frames 40 through 43 illustrate typical frames. Each frame is divided into a plurality of channels 44. Each channel contains a data word from a corresponding input line 24.

The data frames sent by interface unit 20 are received by interface unit 21 which unpacks the data in the frames to produce individual data streams. These data streams are then transmitted on output lines 25 to the various users connected to interface unit 21. Similarly, frames sent by interface unit 21 on line 31 are unpacked by interface unit 20 and transmitted on the output lines 25 connected thereto.

Transmission lines 30 and 31 typically include a number of repeaters 50 which compensate for losses in the transmission lines. These repeaters must remain synchronized with the interface units 20 and 21. This is accomplished by using the voltage transitions in the data streams. Hence, long strings of "0" bits must be avoided. As will be explained below, this places certain restrictions on the data words transmitted in the various channels 44.

Facility 10 services two different types of users. The first type of user, shown at 60 and 62, transmits and receives voice quality data. The second type of user, shown at 64 through 67, transmits and receives digital data. These latter users can not tolerate the high error rates associated with voice quality transmission lines. Voice quality lines have error rates that may be as high as $10^{-3}$, whereas digital data transmission requires an error rate of the order of $10^{-9}$.

To provide these lower error rates for users 64–67, facility 10 includes error correcting circuitry 80 for reducing error rates. Error correcting circuit 80 encrypts each word input to it on line 82 into two digital words which are output to two separate channels of interface 20. Similarly, error correcting circuit 80 receives two digital words from two different channels on interface 20 and decrypts these words to form a single data word which is then transmitted to the user connected thereto on line 84.

Error correcting codes are well known to those skilled in the art; hence they will not be discussed in detail here. For the purpose of this discussion it is sufficient to note that there exist a number of codes that allow errors in transmission to be detected and a large fraction of the detected errors corrected. In a typical coding scheme, a data word having D bits is encrypted to form a second data word having Q bits where $Q>D$. This second word is transmitted over lines 30 and 31.

Since facility 10 is optimized for transmitting words of one size in each channel, it is preferred that Q be a multiple of D. In this case, D may be converted into one or more words that are indistinguishable from normal voice quality data words from the standpoint of interface units 20 and 21. For example, user 64 transmits words $x_1, x_2, \ldots$ to error correcting circuit 80. Error correcting circuit 80 encrypts each word, $x_i$, a large digital word having 2D bits, which is then broken into two D-bit words, $^aX_i$ and $^bX_i$, which will be referred to as the first and second encoded words, respectively. The first encoded words are outputted to a first channel on interface unit 20 and the second encoded words are outputted to a second channel of interface unit 20. Hence, from the point of view of interface unit 20, the digital data user appears to be two different voice quality data users.

Similarly, error correcting circuit 80 receives two streams of digital data words which it combines into a single data stream. Two digital words, one word from each data stream, are first combined into a word having twice as many bits. This data word represents the encrypted data sent by a user connected to facility 10. This encrypted word is then decrypted to form the word sent to the user. As will be explained in more detail below, the decryption process allows errors to be detected and corrected.

Facility 10 is primarily designed for carrying voice quality data. The existing hardware investment in such facilities is quite large. It is, therefore, important that changes needed to include low error rate digital data service on facility 10 be minimized. Hence, each digital data user is preferably treated as two independent voice data users. As a result, the specific channels assigned to each of the encoded words may not be predicted in advance.

As noted above, the repeaters 50 require a minimum density of "1" bits to remain synchronized with interface units 20 and 21. If the channels in which the encoded words were transmitted were always adjacent to each other, this requirement could be satisfied by using a code in which each pair of encoded words had at least one "1", i.e., at least one of the words $^aX$ and $^bX$ is non-zero for each possible value of x. Such codes are known to the prior art.

However, there is no guarantee that the encoded words will be assigned to adjacent channels in the transmission frames. Hence, it is important that each encoded word include at least one "1" bit. That is, when a data word x is transformed into encoded words $^aX$ and $^bX$, both $^aX$ and $^bX$ must be non-zero for all values of x. Such codes are not known to the prior art.

In prior art transmission facilities, this problem is overcome by limiting the values of x. For example, in a typical T1 transmission facility, each user sends and receives data in 8-bit bytes, referred to as "user words". Digital data is encoded into 16-bit words using conventional error correcting codes. Each 16-bit word is then divided into two encoded words consisting of one byte each. These encoded words are then transmitted on different channels in the facility. It can be shown that, if the user words are restricted to the values between 128 and 255, each of the encoded data words will contain at least one "1". This restriction is equivalent to forcing a "1" bit into the most significant position of each user word and limiting the user to the 7 least significant bits in the user word.

The problem with this prior art solution is that it reduces the effective throughput of the T1 transmission facility. Typically, the T1 transmission facility is capable of provided service at 64 Kbits/sec on each channel. If all 8 bits are used for data, two T1 channels can provide 64 Kbits/sec of error corrected data. By restricting the input data to bytes having a "1" in the most significant position, this data rate is reduced to 56 Kbits/sec. Hence, an error correcting circuit that employed an error correcting code that guaranteed that both encoded words had at least one "1" bit for all 256 possible values of the user word would significantly increase the effective data rates.

The present invention comprises an error correcting circuit that may be used to replace error correcting circuit 80 shown in FIG. 1. The present invention includes an error correcting code that generates encoded words having at least "1" bit for all possible values of the user word. An error correcting code according to the present invention is derived from a conventional error correcting code by transforming the conventional error correcting code using a transformation that does not change the level of error correction, but does change the density of "1" bits in the encoded words. With an error correcting code according to the present invention, each encoded word contains at least one "1" bit. For the purpose of this discussion, an error correcting code in which data words, x, having D data bits are transformed into encrypted words, X, having E bits will be referred to as an (E, D) error correcting code. The E data bits are then divided into a plurality of data words for transmission over the error prone circuitry. As noted above, in the preferred embodiment, E is twice D. That is, in the conventional preferred encoding scheme, x is transformed into X, which is then divided into two encoded words, $^1X$ and $^2X$, respectively, having D bits each.

In the preferred embodiment of the present invention, a D-bit data word, x, is transformed into a code word, X, having 2D bits using a (2D,D) error correcting code. X is then transformed via a second transformation, T, into Y which also has 2D bits. Y is then divided into two D-bit encoded words, $^1Y$ and $^2Y$, respectively, for transmission over the error prone circuit. Upon reaching the other end of the error prone circuit, $^1Y$ and $^2Y$ are recombined to form Y which is then transformed into X via the inverse of transformation T. X is then decoded using the (2D,D) error correcting code.

The transformation T must have two properties. First, it must have a unique inverse, $T^{-1}$; this requirement is imposed by the need to calculate X from Y. Second, $^1Y$ and $^2Y$ must each have at least one "1" bit independent of the value of x from which $^1Y$ and $^2Y$ are calculated.

One form of transformation which has the potential for providing these properties comprises interchanging the bits in X and replacing the bits in certain locations by the complement thereof. This is shown in Table I which illustrates the transformation of a conventional (16,8) error correcting code to an improved error correcting code according to the present invention.

TABLE I

| DATA WORD | STANDARD ERROR CORRECTING CODE | | | | | | | | | IMPROVED ERROR CORRECTING CODE | | | | | | | | | | |
|---|---|---|---|---|---|---|---|---|---|---|---|---|---|---|---|---|---|---|---|---|
| | $^1x$ | | | | | | | | $^2x$ | | | | | | $^1y$ | | | | | $^2y$ | | | | |
| x | 1 2 3 4 5 6 7 8 | A | B | C | D | E | F | G | H | 1 2 4 7 | A | B | $\overline{D}$ | $\overline{G}$ | 3 5 6 8 | C | E | $\overline{F}$ | $\overline{H}$ |
| 0 | 0 0 0 0 0 0 0 0 | 0 | 0 | 0 | 0 | 0 | 0 | 0 | 0 | 0 0 0 0 | 0 | 0 | 1 | 1 | 0 0 0 0 | 0 | 0 | 1 | 1 |
| 1 | 1 0 0 0 0 0 0 0 | 1 | 0 | 0 | 1 | 1 | 1 | 0 | 0 | 1 0 0 0 | 1 | 0 | 0 | 1 | 0 0 0 0 | 0 | 1 | 0 | 1 |
| 2 | 0 1 0 0 0 0 0 0 | 0 | 1 | 0 | 0 | 1 | 1 | 1 | 0 | 0 1 0 0 | 0 | 1 | 1 | 0 | 0 0 0 0 | 0 | 1 | 0 | 1 |
| 3 | 1 1 0 0 0 0 0 0 | 1 | 1 | 0 | 1 | 0 | 0 | 1 | 0 | 1 1 0 0 | 1 | 1 | 0 | 0 | 0 0 0 0 | 0 | 0 | 1 | 1 |
| 4 | 0 0 1 0 0 0 0 0 | 0 | 0 | 1 | 0 | 0 | 1 | 1 | 1 | 0 0 0 0 | 0 | 0 | 1 | 0 | 1 0 0 0 | 1 | 0 | 0 | 0 |
| 5 | 1 0 1 0 0 0 0 0 | 1 | 0 | 1 | 1 | 1 | 0 | 1 | 1 | 1 0 0 0 | 1 | 0 | 0 | 0 | 1 0 0 0 | 1 | 1 | 1 | 0 |
| 6 | 0 1 1 0 0 0 0 0 | 0 | 1 | 1 | 0 | 1 | 0 | 0 | 1 | 0 1 0 0 | 0 | 1 | 1 | 1 | 1 0 0 0 | 1 | 1 | 1 | 0 |
| 7 | 1 1 1 0 0 0 0 0 | 1 | 1 | 1 | 1 | 0 | 1 | 0 | 1 | 1 1 0 0 | 1 | 1 | 0 | 1 | 1 0 0 0 | 1 | 0 | 0 | 0 |
| 8 | 0 0 0 1 0 0 0 0 | 1 | 0 | 0 | 0 | 1 | 1 | 1 | 1 | 0 0 1 0 | 1 | 0 | 1 | 0 | 0 0 0 0 | 0 | 1 | 0 | 0 |
| 9 | 1 0 0 1 0 0 0 0 | 0 | 0 | 0 | 1 | 0 | 0 | 1 | 1 | 1 0 1 0 | 0 | 0 | 0 | 0 | 0 0 0 0 | 0 | 0 | 1 | 0 |
| 10 | 0 1 0 1 0 0 0 0 | 1 | 1 | 0 | 0 | 0 | 0 | 0 | 1 | 0 1 1 0 | 1 | 1 | 1 | 1 | 0 0 0 0 | 0 | 0 | 1 | 0 |
| 11 | 1 1 0 1 0 0 0 0 | 0 | 1 | 0 | 1 | 1 | 1 | 0 | 1 | 1 1 1 0 | 0 | 1 | 0 | 1 | 0 0 0 0 | 0 | 1 | 0 | 0 |
| 12 | 0 0 1 1 0 0 0 0 | 1 | 0 | 1 | 0 | 1 | 0 | 0 | 0 | 0 0 1 0 | 1 | 0 | 1 | 1 | 1 0 0 0 | 1 | 1 | 1 | 1 |
| 13 | 1 0 1 1 0 0 0 0 | 0 | 0 | 1 | 1 | 0 | 1 | 0 | 0 | 1 0 1 0 | 0 | 0 | 0 | 1 | 1 0 0 0 | 1 | 0 | 0 | 1 |
| 14 | 0 1 1 1 0 0 0 0 | 1 | 1 | 1 | 0 | 0 | 1 | 1 | 0 | 0 1 1 0 | 1 | 1 | 1 | 0 | 1 0 0 0 | 1 | 0 | 0 | 1 |
| 15 | 1 1 1 1 0 0 0 0 | 0 | 1 | 1 | 1 | 1 | 0 | 1 | 0 | 1 1 1 0 | 0 | 1 | 0 | 0 | 1 0 0 0 | 1 | 1 | 1 | 1 |
| 16 | 0 0 0 0 1 0 0 0 | 1 | 1 | 0 | 1 | 1 | 0 | 1 | 1 | 0 0 0 0 | 1 | 1 | 0 | 0 | 0 1 0 0 | 0 | 1 | 1 | 0 |
| 17 | 1 0 0 0 1 0 0 0 | 0 | 1 | 0 | 0 | 0 | 1 | 1 | 1 | 1 0 0 0 | 0 | 1 | 1 | 0 | 0 1 0 0 | 0 | 0 | 0 | 0 |
| 18 | 0 1 0 0 1 0 0 0 | 1 | 0 | 0 | 1 | 0 | 1 | 0 | 1 | 0 1 0 0 | 1 | 0 | 0 | 1 | 0 1 0 0 | 0 | 0 | 0 | 0 |
| 19 | 1 1 0 0 1 0 0 0 | 0 | 0 | 0 | 0 | 1 | 0 | 0 | 1 | 1 1 0 0 | 0 | 0 | 1 | 1 | 0 1 0 0 | 0 | 1 | 1 | 0 |
| 20 | 0 0 1 0 1 0 0 0 | 1 | 1 | 1 | 1 | 1 | 1 | 0 | 0 | 0 0 0 0 | 1 | 1 | 0 | 1 | 1 1 0 0 | 1 | 1 | 0 | 1 |
| 21 | 1 0 1 0 1 0 0 0 | 0 | 1 | 1 | 0 | 0 | 0 | 0 | 0 | 1 0 0 0 | 0 | 1 | 1 | 1 | 1 1 0 0 | 1 | 0 | 1 | 1 |
| 22 | 0 1 1 0 1 0 0 0 | 1 | 0 | 1 | 1 | 0 | 0 | 1 | 0 | 0 1 0 0 | 1 | 0 | 0 | 0 | 1 1 0 0 | 1 | 0 | 1 | 1 |
| 23 | 1 1 1 0 1 0 0 0 | 0 | 0 | 1 | 0 | 1 | 1 | 1 | 0 | 1 1 0 0 | 0 | 0 | 1 | 0 | 1 1 0 0 | 1 | 1 | 0 | 1 |
| 24 | 0 0 0 1 1 0 0 0 | 0 | 1 | 0 | 1 | 0 | 1 | 0 | 0 | 0 0 1 0 | 0 | 1 | 0 | 1 | 0 1 0 0 | 0 | 0 | 0 | 1 |
| 25 | 1 0 0 1 1 0 0 0 | 1 | 1 | 0 | 0 | 1 | 0 | 0 | 0 | 1 0 1 0 | 1 | 1 | 1 | 1 | 0 1 0 0 | 0 | 1 | 1 | 1 |
| 26 | 0 1 0 1 1 0 0 0 | 0 | 0 | 0 | 1 | 1 | 0 | 1 | 0 | 0 1 1 0 | 0 | 0 | 0 | 0 | 0 1 0 0 | 0 | 1 | 1 | 1 |
| 27 | 1 1 0 1 1 0 0 0 | 1 | 0 | 0 | 0 | 0 | 1 | 1 | 0 | 1 1 1 0 | 1 | 0 | 1 | 0 | 0 1 0 0 | 0 | 0 | 0 | 1 |
| 28 | 0 0 1 1 1 0 0 0 | 0 | 1 | 1 | 1 | 0 | 0 | 1 | 1 | 0 0 1 0 | 0 | 1 | 0 | 0 | 1 1 0 0 | 1 | 0 | 1 | 0 |
| 29 | 1 0 1 1 1 0 0 0 | 1 | 1 | 1 | 0 | 1 | 1 | 1 | 1 | 1 0 1 0 | 1 | 1 | 1 | 0 | 1 1 0 0 | 1 | 1 | 0 | 0 |
| 30 | 0 1 1 1 1 0 0 0 | 0 | 0 | 1 | 1 | 1 | 1 | 0 | 1 | 0 1 1 0 | 0 | 0 | 0 | 1 | 1 1 0 0 | 1 | 1 | 0 | 0 |
| 31 | 1 1 1 1 1 0 0 0 | 1 | 0 | 1 | 0 | 0 | 0 | 0 | 1 | 1 1 1 0 | 1 | 0 | 1 | 1 | 1 1 0 0 | 1 | 0 | 1 | 0 |
| 32 | 0 0 0 0 0 1 0 0 | 1 | 1 | 1 | 1 | 0 | 0 | 0 | 1 | 0 0 0 0 | 1 | 1 | 0 | 1 | 0 0 1 0 | 1 | 0 | 1 | 0 |
| 33 | 1 0 0 0 0 1 0 0 | 0 | 1 | 1 | 0 | 1 | 1 | 0 | 1 | 1 0 0 0 | 0 | 1 | 1 | 1 | 0 0 1 0 | 1 | 1 | 0 | 0 |
| 34 | 0 1 0 0 0 1 0 0 | 1 | 0 | 1 | 1 | 1 | 1 | 1 | 1 | 0 1 0 0 | 1 | 0 | 0 | 0 | 0 0 1 0 | 1 | 1 | 0 | 0 |
| 35 | 1 1 0 0 0 1 0 0 | 0 | 0 | 1 | 0 | 0 | 0 | 1 | 1 | 1 1 0 0 | 0 | 0 | 1 | 0 | 0 0 1 0 | 1 | 0 | 1 | 0 |
| 36 | 0 0 1 0 0 1 0 0 | 1 | 1 | 0 | 1 | 0 | 1 | 1 | 0 | 0 0 0 0 | 1 | 1 | 0 | 0 | 1 0 1 0 | 0 | 0 | 0 | 1 |
| 37 | 1 0 1 0 0 1 0 0 | 0 | 1 | 0 | 0 | 1 | 0 | 1 | 0 | 1 0 0 0 | 0 | 1 | 1 | 0 | 1 0 1 0 | 0 | 1 | 1 | 1 |
| 38 | 0 1 1 0 0 1 0 0 | 1 | 0 | 0 | 1 | 1 | 0 | 0 | 0 | 0 1 0 0 | 1 | 0 | 0 | 1 | 1 0 1 0 | 0 | 1 | 1 | 1 |
| 39 | 1 1 1 0 0 1 0 0 | 0 | 0 | 0 | 0 | 0 | 1 | 0 | 0 | 1 1 0 0 | 0 | 0 | 1 | 1 | 1 0 1 0 | 0 | 0 | 0 | 1 |
| 40 | 0 0 0 1 0 1 0 0 | 0 | 1 | 1 | 1 | 1 | 1 | 1 | 0 | 0 0 1 0 | 0 | 1 | 0 | 0 | 0 0 1 0 | 1 | 1 | 0 | 1 |
| 41 | 1 0 0 1 0 1 0 0 | 1 | 1 | 1 | 0 | 0 | 0 | 1 | 0 | 1 0 1 0 | 1 | 1 | 1 | 0 | 0 0 1 0 | 1 | 0 | 1 | 1 |
| 42 | 0 1 0 1 0 1 0 0 | 0 | 0 | 1 | 1 | 0 | 0 | 0 | 0 | 0 1 1 0 | 0 | 0 | 0 | 1 | 0 0 1 0 | 1 | 0 | 1 | 1 |
| 43 | 1 1 0 1 0 1 0 0 | 1 | 0 | 1 | 0 | 1 | 1 | 0 | 0 | 1 1 1 0 | 1 | 0 | 1 | 1 | 0 0 1 0 | 1 | 1 | 0 | 1 |
| 44 | 0 0 1 1 0 1 0 0 | 0 | 1 | 0 | 1 | 1 | 0 | 0 | 1 | 0 0 1 0 | 0 | 1 | 0 | 1 | 1 0 1 0 | 0 | 1 | 1 | 0 |
| 45 | 1 0 1 1 0 1 0 0 | 1 | 1 | 0 | 0 | 0 | 1 | 0 | 1 | 1 0 1 0 | 1 | 1 | 1 | 1 | 1 0 1 0 | 0 | 0 | 0 | 0 |
| 46 | 0 1 1 1 0 1 0 0 | 0 | 0 | 0 | 1 | 0 | 1 | 1 | 1 | 0 1 1 0 | 0 | 0 | 0 | 0 | 1 0 1 0 | 0 | 0 | 0 | 0 |
| 47 | 1 1 1 1 0 1 0 0 | 1 | 0 | 0 | 0 | 1 | 0 | 1 | 1 | 1 1 1 0 | 1 | 0 | 1 | 0 | 1 0 1 0 | 0 | 1 | 1 | 0 |
| 48 | 0 0 0 0 1 1 0 0 | 0 | 0 | 1 | 0 | 1 | 0 | 1 | 0 | 0 0 0 0 | 0 | 0 | 1 | 0 | 0 1 1 0 | 1 | 1 | 1 | 1 |
| 49 | 1 0 0 0 1 1 0 0 | 1 | 0 | 1 | 1 | 0 | 1 | 1 | 0 | 1 0 0 0 | 1 | 0 | 0 | 0 | 0 1 1 0 | 1 | 0 | 0 | 1 |
| 50 | 0 1 0 0 1 1 0 0 | 0 | 1 | 1 | 0 | 0 | 1 | 0 | 0 | 0 1 0 0 | 0 | 1 | 1 | 1 | 0 1 1 0 | 1 | 0 | 0 | 1 |
| 51 | 1 1 0 0 1 1 0 0 | 1 | 1 | 1 | 1 | 1 | 0 | 0 | 0 | 1 1 0 0 | 1 | 1 | 0 | 1 | 0 1 1 0 | 1 | 1 | 1 | 1 |
| 52 | 0 0 1 0 1 1 0 0 | 0 | 0 | 0 | 0 | 1 | 1 | 0 | 1 | 0 0 0 0 | 0 | 0 | 1 | 1 | 1 1 1 0 | 0 | 1 | 0 | 0 |
| 53 | 1 0 1 0 1 1 0 0 | 1 | 0 | 0 | 1 | 0 | 0 | 0 | 1 | 1 0 0 0 | 1 | 0 | 0 | 1 | 1 1 1 0 | 0 | 0 | 1 | 0 |
| 54 | 0 1 1 0 1 1 0 0 | 0 | 1 | 0 | 0 | 0 | 0 | 1 | 1 | 0 1 0 0 | 0 | 1 | 1 | 0 | 1 1 1 0 | 0 | 0 | 1 | 0 |
| 55 | 1 1 1 0 1 1 0 0 | 1 | 1 | 0 | 1 | 1 | 1 | 1 | 1 | 1 1 0 0 | 1 | 1 | 0 | 0 | 1 1 1 0 | 0 | 1 | 0 | 0 |
| 56 | 0 0 0 1 1 1 0 0 | 1 | 0 | 1 | 0 | 0 | 1 | 0 | 0 | 0 0 1 0 | 1 | 0 | 1 | 1 | 0 1 1 0 | 1 | 0 | 0 | 0 |
| 57 | 1 0 0 1 1 1 0 0 | 0 | 0 | 1 | 1 | 1 | 0 | 0 | 1 | 1 0 1 0 | 0 | 0 | 0 | 1 | 0 1 1 0 | 1 | 1 | 1 | 0 |
| 58 | 0 1 0 1 1 1 0 0 | 1 | 1 | 1 | 0 | 1 | 0 | 1 | 0 | 0 1 1 0 | 1 | 1 | 1 | 0 | 0 1 1 0 | 1 | 1 | 1 | 0 |
| 59 | 1 1 0 1 1 1 0 0 | 0 | 1 | 1 | 1 | 0 | 1 | 1 | 0 | 1 1 1 0 | 0 | 1 | 0 | 0 | 0 1 1 0 | 1 | 0 | 0 | 0 |
| 60 | 0 0 1 1 1 1 0 0 | 1 | 0 | 0 | 0 | 0 | 1 | 0 | 0 | 0 0 1 0 | 1 | 0 | 1 | 1 | 1 1 1 0 | 0 | 0 | 1 | 1 |
| 61 | 1 0 1 1 1 1 0 0 | 0 | 0 | 0 | 1 | 1 | 1 | 1 | 0 | 1 0 1 0 | 0 | 0 | 0 | 0 | 1 1 1 0 | 0 | 1 | 0 | 1 |
| 62 | 0 1 1 1 1 1 0 0 | 1 | 1 | 0 | 0 | 1 | 1 | 0 | 0 | 0 1 1 0 | 1 | 1 | 1 | 1 | 1 1 1 0 | 0 | 1 | 0 | 1 |
| 63 | 1 1 1 1 1 1 0 0 | 0 | 1 | 0 | 1 | 0 | 0 | 0 | 0 | 1 1 1 0 | 0 | 1 | 0 | 1 | 1 1 1 0 | 0 | 0 | 1 | 1 |
| 64 | 0 0 0 0 0 0 1 0 | 1 | 1 | 1 | 0 | 0 | 1 | 0 | 0 | 0 0 0 1 | 1 | 1 | 1 | 1 | 0 0 0 0 | 0 | 0 | 1 | 1 |
| 65 | 1 0 0 0 0 0 1 0 | 0 | 1 | 1 | 1 | 1 | 0 | 0 | 0 | 1 0 0 1 | 0 | 1 | 0 | 1 | 0 0 0 0 | 0 | 1 | 1 | 1 |
| 66 | 0 1 0 0 0 0 1 0 | 1 | 0 | 1 | 0 | 1 | 0 | 1 | 0 | 0 1 0 1 | 1 | 0 | 1 | 0 | 0 0 0 0 | 0 | 1 | 1 | 1 |
| 67 | 1 1 0 0 0 0 1 0 | 0 | 0 | 1 | 1 | 0 | 1 | 1 | 0 | 1 1 0 1 | 0 | 0 | 0 | 0 | 0 0 0 0 | 0 | 0 | 1 | 1 |
| 68 | 0 0 1 0 0 0 1 0 | 1 | 1 | 0 | 0 | 0 | 1 | 1 | 1 | 0 0 0 1 | 1 | 1 | 1 | 0 | 1 0 0 0 | 0 | 0 | 1 | 0 |
| 69 | 1 0 1 0 0 0 1 0 | 0 | 1 | 0 | 1 | 1 | 1 | 1 | 1 | 1 0 0 1 | 0 | 1 | 0 | 0 | 1 0 0 0 | 0 | 1 | 0 | 0 |

TABLE I-continued

| DATA WORD | STANDARD ERROR CORRECTING CODE | | | | | | | | | | | | | | | | IMPROVED ERROR CORRECTING CODE | | | | | | | | | |
|---|---|---|---|---|---|---|---|---|---|---|---|---|---|---|---|---|---|---|---|---|---|---|---|---|---|---|
| | 1x | | | | | | | | 2x | | | | | | | | 1y | | | | | 2y | | | | |
| x | 1 2 3 4 5 6 7 8 | | | | | | | | A | B | C | D | E | F | G | H | 1 2 4 7 | A | B | $\bar{D}$ | $\bar{G}$ | 3 5 6 8 | C | E | $\bar{F}$ | $\bar{H}$ |
| 70 | 0 1 1 0 0 0 1 0 | | | | | | | | 1 | 0 | 0 | 0 | 1 | 1 | 0 | 1 | 0 1 0 1 | 1 | 0 | 1 | 1 | 1 0 0 0 | 0 | 1 | 0 | 0 |
| 71 | 1 1 1 0 0 0 1 0 | | | | | | | | 0 | 0 | 0 | 1 | 0 | 0 | 0 | 1 | 1 1 0 1 | 0 | 0 | 0 | 1 | 1 0 0 0 | 0 | 0 | 1 | 0 |
| 72 | 0 0 0 1 0 0 1 0 | | | | | | | | 0 | 1 | 1 | 0 | 1 | 0 | 1 | 1 | 0 0 1 1 | 0 | 1 | 1 | 0 | 0 0 0 0 | 1 | 1 | 1 | 0 |
| 73 | 1 0 0 1 0 0 1 0 | | | | | | | | 1 | 1 | 1 | 1 | 0 | 1 | 1 | 1 | 1 0 1 1 | 1 | 1 | 0 | 0 | 0 0 0 0 | 1 | 0 | 0 | 0 |
| 74 | 0 1 0 1 0 0 1 0 | | | | | | | | 0 | 0 | 1 | 0 | 0 | 1 | 0 | 1 | 0 1 1 1 | 0 | 0 | 1 | 1 | 0 0 0 0 | 1 | 0 | 0 | 0 |
| 75 | 1 1 0 1 0 0 1 0 | | | | | | | | 1 | 0 | 1 | 1 | 1 | 0 | 0 | 1 | 1 1 1 1 | 1 | 0 | 0 | 1 | 0 0 0 0 | 1 | 1 | 1 | 0 |
| 76 | 0 0 1 1 0 0 1 0 | | | | | | | | 0 | 1 | 0 | 0 | 1 | 1 | 0 | 0 | 0 0 1 1 | 0 | 1 | 1 | 1 | 1 0 0 0 | 0 | 1 | 0 | 1 |
| 77 | 1 0 1 1 0 0 1 0 | | | | | | | | 1 | 1 | 0 | 1 | 0 | 0 | 0 | 0 | 1 0 1 1 | 1 | 1 | 0 | 1 | 1 0 0 0 | 0 | 0 | 1 | 1 |
| 78 | 0 1 1 1 0 0 1 0 | | | | | | | | 0 | 0 | 0 | 0 | 0 | 0 | 1 | 1 | 0 1 1 1 | 0 | 0 | 1 | 0 | 1 0 0 0 | 0 | 0 | 1 | 1 |
| 79 | 1 1 1 1 0 0 1 0 | | | | | | | | 1 | 0 | 0 | 1 | 1 | 1 | 1 | 0 | 1 1 1 1 | 1 | 0 | 0 | 0 | 1 0 0 0 | 0 | 1 | 0 | 1 |
| 80 | 0 0 0 0 1 0 1 0 | | | | | | | | 0 | 0 | 1 | 1 | 1 | 1 | 1 | 1 | 0 0 0 1 | 0 | 0 | 0 | 0 | 0 1 0 0 | 1 | 1 | 0 | 0 |
| 81 | 1 0 0 0 1 0 1 0 | | | | | | | | 1 | 0 | 1 | 0 | 0 | 0 | 1 | 1 | 1 0 0 1 | 1 | 0 | 1 | 0 | 0 1 0 0 | 1 | 0 | 1 | 0 |
| 82 | 0 1 0 0 1 0 1 0 | | | | | | | | 0 | 1 | 1 | 1 | 0 | 0 | 0 | 1 | 0 1 0 1 | 0 | 1 | 0 | 1 | 0 1 0 0 | 1 | 0 | 1 | 0 |
| 83 | 1 1 0 0 1 0 1 0 | | | | | | | | 1 | 1 | 1 | 0 | 1 | 1 | 0 | 1 | 1 1 0 1 | 1 | 1 | 1 | 1 | 0 1 0 0 | 1 | 1 | 0 | 0 |
| 84 | 0 0 1 0 1 0 1 0 | | | | | | | | 0 | 0 | 0 | 1 | 1 | 0 | 0 | 0 | 0 0 0 1 | 0 | 0 | 0 | 1 | 1 1 0 0 | 0 | 1 | 1 | 1 |
| 85 | 1 0 1 0 1 0 1 0 | | | | | | | | 1 | 0 | 0 | 0 | 0 | 1 | 0 | 0 | 1 0 0 1 | 1 | 0 | 1 | 1 | 1 1 0 0 | 0 | 0 | 0 | 1 |
| 86 | 0 1 1 0 1 0 1 0 | | | | | | | | 0 | 1 | 0 | 1 | 0 | 1 | 1 | 0 | 0 1 0 1 | 0 | 1 | 0 | 0 | 1 1 0 0 | 0 | 0 | 0 | 1 |
| 87 | 1 1 1 0 1 0 1 0 | | | | | | | | 1 | 1 | 0 | 0 | 1 | 0 | 1 | 0 | 1 1 0 1 | 1 | 1 | 1 | 0 | 1 1 0 0 | 0 | 1 | 1 | 1 |
| 88 | 0 0 0 1 1 0 1 0 | | | | | | | | 1 | 0 | 1 | 1 | 0 | 0 | 0 | 0 | 0 0 1 1 | 1 | 0 | 0 | 1 | 0 1 0 0 | 1 | 0 | 1 | 1 |
| 89 | 1 0 0 1 1 0 1 0 | | | | | | | | 0 | 0 | 1 | 0 | 1 | 1 | 0 | 0 | 1 0 1 1 | 0 | 0 | 1 | 1 | 0 1 0 0 | 1 | 1 | 0 | 1 |
| 90 | 0 1 0 1 1 0 1 0 | | | | | | | | 1 | 1 | 1 | 1 | 1 | 1 | 1 | 0 | 0 1 1 1 | 1 | 1 | 0 | 0 | 0 1 0 0 | 1 | 1 | 0 | 1 |
| 91 | 1 1 0 1 1 0 1 0 | | | | | | | | 0 | 1 | 1 | 0 | 0 | 0 | 1 | 0 | 1 1 1 1 | 0 | 1 | 1 | 0 | 0 1 0 0 | 1 | 0 | 1 | 1 |
| 92 | 0 0 1 1 1 0 1 0 | | | | | | | | 1 | 0 | 0 | 1 | 0 | 1 | 1 | 1 | 0 0 1 1 | 1 | 0 | 0 | 0 | 1 1 0 0 | 0 | 0 | 0 | 0 |
| 93 | 1 0 1 1 1 0 1 0 | | | | | | | | 0 | 0 | 0 | 0 | 1 | 0 | 1 | 1 | 1 0 1 1 | 0 | 0 | 1 | 0 | 1 1 0 0 | 0 | 1 | 1 | 0 |
| 94 | 0 1 1 1 1 0 1 0 | | | | | | | | 1 | 1 | 0 | 1 | 1 | 0 | 0 | 1 | 0 1 1 1 | 1 | 1 | 0 | 1 | 1 1 0 0 | 0 | 1 | 1 | 0 |
| 95 | 1 1 1 1 1 0 1 0 | | | | | | | | 0 | 1 | 0 | 0 | 0 | 1 | 0 | 1 | 1 1 1 1 | 0 | 1 | 1 | 1 | 1 1 0 0 | 0 | 0 | 0 | 0 |
| 96 | 0 0 0 0 0 1 1 0 | | | | | | | | 0 | 0 | 0 | 1 | 0 | 1 | 0 | 1 | 0 0 0 1 | 0 | 0 | 0 | 1 | 0 0 1 0 | 0 | 0 | 0 | 0 |
| 97 | 1 0 0 0 0 1 1 0 | | | | | | | | 1 | 0 | 0 | 0 | 1 | 0 | 0 | 1 | 1 0 0 1 | 1 | 0 | 1 | 1 | 0 0 1 0 | 0 | 1 | 1 | 0 |
| 98 | 0 1 0 0 0 1 1 0 | | | | | | | | 0 | 1 | 0 | 1 | 1 | 0 | 1 | 1 | 0 1 0 1 | 0 | 1 | 0 | 0 | 0 0 1 0 | 0 | 1 | 1 | 0 |
| 99 | 1 1 0 0 0 1 1 0 | | | | | | | | 1 | 1 | 0 | 0 | 0 | 1 | 1 | 0 | 1 1 0 1 | 1 | 1 | 1 | 0 | 0 0 1 0 | 0 | 0 | 0 | 0 |
| 100 | 0 0 1 0 0 1 1 0 | | | | | | | | 0 | 0 | 1 | 1 | 0 | 0 | 1 | 0 | 0 0 0 1 | 0 | 0 | 0 | 0 | 1 0 1 0 | 1 | 0 | 1 | 1 |
| 101 | 1 0 1 0 0 1 1 0 | | | | | | | | 1 | 0 | 1 | 0 | 1 | 1 | 1 | 0 | 1 0 0 1 | 1 | 0 | 1 | 0 | 1 0 1 0 | 1 | 1 | 0 | 1 |
| 102 | 0 1 1 0 0 1 1 0 | | | | | | | | 0 | 1 | 1 | 1 | 1 | 1 | 0 | 0 | 0 1 0 1 | 0 | 1 | 0 | 1 | 1 0 1 0 | 1 | 1 | 0 | 1 |
| 103 | 1 1 1 0 0 1 1 0 | | | | | | | | 1 | 1 | 1 | 0 | 0 | 0 | 0 | 0 | 1 1 0 1 | 1 | 1 | 1 | 1 | 1 0 1 0 | 1 | 0 | 1 | 1 |
| 104 | 0 0 0 1 0 1 1 0 | | | | | | | | 1 | 0 | 0 | 1 | 1 | 0 | 1 | 0 | 0 0 1 1 | 1 | 0 | 0 | 1 | 0 0 1 0 | 0 | 1 | 1 | 1 |
| 105 | 1 0 0 1 0 1 1 0 | | | | | | | | 0 | 0 | 0 | 0 | 0 | 1 | 1 | 0 | 1 0 1 1 | 0 | 0 | 1 | 0 | 0 0 1 0 | 0 | 0 | 0 | 1 |
| 106 | 0 1 0 1 0 1 1 0 | | | | | | | | 1 | 1 | 0 | 1 | 0 | 1 | 0 | 0 | 0 1 1 1 | 1 | 1 | 0 | 1 | 0 0 1 0 | 0 | 0 | 0 | 1 |
| 107 | 1 1 0 1 0 1 1 0 | | | | | | | | 0 | 1 | 0 | 0 | 1 | 0 | 0 | 0 | 1 1 1 1 | 0 | 1 | 1 | 1 | 0 0 1 0 | 0 | 1 | 1 | 1 |
| 108 | 0 0 1 1 0 1 1 0 | | | | | | | | 1 | 0 | 1 | 1 | 1 | 1 | 0 | 1 | 0 0 1 1 | 1 | 0 | 0 | 1 | 1 0 1 0 | 1 | 1 | 0 | 0 |
| 109 | 1 0 1 1 0 1 1 0 | | | | | | | | 0 | 0 | 1 | 0 | 0 | 0 | 0 | 1 | 1 0 1 1 | 0 | 0 | 1 | 1 | 1 0 1 0 | 1 | 0 | 1 | 0 |
| 110 | 0 1 1 1 0 1 1 0 | | | | | | | | 1 | 1 | 1 | 1 | 0 | 0 | 1 | 1 | 0 1 1 1 | 1 | 1 | 0 | 0 | 1 0 1 0 | 1 | 0 | 1 | 0 |
| 111 | 1 1 1 1 0 1 1 0 | | | | | | | | 0 | 1 | 1 | 0 | 1 | 1 | 1 | 1 | 1 1 1 1 | 0 | 1 | 1 | 0 | 1 0 1 0 | 1 | 1 | 0 | 0 |
| 112 | 0 0 0 0 1 1 1 0 | | | | | | | | 1 | 1 | 0 | 0 | 1 | 1 | 1 | 0 | 0 0 0 1 | 1 | 1 | 1 | 0 | 0 1 1 0 | 0 | 1 | 0 | 1 |
| 113 | 1 0 0 0 1 1 1 0 | | | | | | | | 0 | 1 | 0 | 1 | 0 | 0 | 1 | 0 | 1 0 0 1 | 0 | 1 | 0 | 0 | 0 1 1 0 | 0 | 0 | 1 | 1 |
| 114 | 0 1 0 0 1 1 1 0 | | | | | | | | 1 | 0 | 0 | 0 | 0 | 0 | 0 | 0 | 0 1 0 1 | 1 | 0 | 1 | 1 | 0 1 1 0 | 0 | 0 | 1 | 1 |
| 115 | 1 1 0 0 1 1 1 0 | | | | | | | | 0 | 0 | 0 | 1 | 1 | 1 | 0 | 0 | 1 1 0 1 | 0 | 0 | 0 | 1 | 0 1 1 0 | 0 | 1 | 0 | 1 |
| 116 | 0 0 1 0 1 1 1 0 | | | | | | | | 1 | 1 | 1 | 0 | 1 | 0 | 0 | 1 | 0 0 0 1 | 1 | 1 | 1 | 1 | 1 1 1 0 | 1 | 1 | 1 | 0 |
| 117 | 1 0 1 0 1 1 1 0 | | | | | | | | 0 | 1 | 1 | 1 | 0 | 1 | 0 | 1 | 1 0 0 1 | 0 | 1 | 0 | 1 | 1 1 1 0 | 1 | 0 | 0 | 0 |
| 118 | 0 1 1 0 1 1 1 0 | | | | | | | | 1 | 0 | 1 | 0 | 0 | 1 | 1 | 1 | 0 1 0 1 | 1 | 0 | 1 | 0 | 1 1 1 0 | 1 | 0 | 0 | 0 |
| 119 | 1 1 1 0 1 1 1 0 | | | | | | | | 0 | 0 | 1 | 1 | 1 | 0 | 1 | 1 | 1 1 0 1 | 0 | 0 | 0 | 0 | 1 1 1 0 | 1 | 1 | 1 | 0 |
| 120 | 0 0 0 1 1 1 1 0 | | | | | | | | 0 | 1 | 0 | 0 | 0 | 0 | 0 | 1 | 0 0 1 1 | 0 | 1 | 1 | 1 | 0 1 1 0 | 0 | 0 | 1 | 0 |
| 121 | 1 0 0 1 1 1 1 0 | | | | | | | | 1 | 1 | 0 | 1 | 1 | 1 | 0 | 1 | 1 0 1 1 | 1 | 1 | 0 | 1 | 0 1 1 0 | 0 | 1 | 0 | 0 |
| 122 | 0 1 0 1 1 1 1 0 | | | | | | | | 0 | 0 | 0 | 0 | 1 | 1 | 1 | 1 | 0 1 1 1 | 0 | 0 | 1 | 0 | 0 1 1 0 | 0 | 1 | 0 | 0 |
| 123 | 1 1 0 1 1 1 1 0 | | | | | | | | 1 | 0 | 0 | 1 | 0 | 0 | 1 | 1 | 1 1 1 1 | 1 | 0 | 0 | 0 | 0 1 1 0 | 0 | 0 | 1 | 0 |
| 124 | 0 0 1 1 1 1 1 0 | | | | | | | | 0 | 1 | 1 | 0 | 0 | 1 | 1 | 0 | 0 0 1 1 | 0 | 1 | 1 | 0 | 1 1 1 0 | 1 | 0 | 0 | 1 |
| 125 | 1 0 1 1 1 1 1 0 | | | | | | | | 1 | 1 | 1 | 1 | 1 | 0 | 1 | 0 | 1 0 1 1 | 1 | 1 | 0 | 0 | 1 1 1 0 | 1 | 1 | 1 | 1 |
| 126 | 0 1 1 1 1 1 1 0 | | | | | | | | 0 | 0 | 1 | 0 | 1 | 0 | 0 | 0 | 0 1 1 1 | 0 | 0 | 1 | 1 | 1 1 1 0 | 1 | 1 | 1 | 1 |
| 127 | 1 1 1 1 1 1 1 0 | | | | | | | | 1 | 0 | 1 | 1 | 0 | 1 | 0 | 0 | 1 1 1 1 | 1 | 0 | 0 | 1 | 1 1 1 0 | 1 | 0 | 0 | 1 |
| 128 | 0 0 0 0 0 0 0 1 | | | | | | | | 0 | 1 | 1 | 1 | 0 | 0 | 1 | 0 | 0 0 0 0 | 0 | 1 | 0 | 0 | 0 0 0 1 | 1 | 0 | 1 | 1 |
| 129 | 1 0 0 0 0 0 0 1 | | | | | | | | 1 | 1 | 1 | 0 | 1 | 1 | 1 | 0 | 1 0 0 0 | 1 | 1 | 1 | 0 | 0 0 0 1 | 1 | 1 | 0 | 1 |
| 130 | 0 1 0 0 0 0 0 1 | | | | | | | | 0 | 0 | 1 | 1 | 1 | 1 | 0 | 0 | 0 1 0 0 | 0 | 0 | 0 | 1 | 0 0 0 1 | 1 | 1 | 0 | 1 |
| 131 | 1 1 0 0 0 0 0 1 | | | | | | | | 1 | 0 | 1 | 0 | 0 | 0 | 0 | 0 | 1 1 0 0 | 1 | 0 | 1 | 1 | 0 0 0 1 | 1 | 0 | 1 | 1 |
| 132 | 0 0 1 0 0 0 0 1 | | | | | | | | 0 | 1 | 0 | 1 | 0 | 1 | 0 | 1 | 0 0 0 0 | 0 | 1 | 0 | 1 | 1 0 0 1 | 0 | 0 | 0 | 0 |
| 133 | 1 0 1 0 0 0 0 1 | | | | | | | | 1 | 1 | 0 | 0 | 1 | 0 | 0 | 1 | 1 0 0 0 | 1 | 1 | 1 | 1 | 1 0 0 1 | 0 | 1 | 1 | 0 |
| 134 | 0 1 1 0 0 0 0 1 | | | | | | | | 0 | 0 | 0 | 0 | 1 | 0 | 1 | 1 | 0 1 0 0 | 0 | 0 | 0 | 0 | 1 0 0 1 | 0 | 1 | 1 | 0 |
| 135 | 1 1 1 0 0 0 0 1 | | | | | | | | 1 | 0 | 0 | 0 | 0 | 1 | 1 | 1 | 1 1 0 0 | 1 | 0 | 1 | 0 | 1 0 0 1 | 0 | 0 | 0 | 0 |
| 136 | 0 0 0 1 0 0 0 1 | | | | | | | | 1 | 1 | 1 | 1 | 1 | 1 | 0 | 1 | 0 0 1 0 | 1 | 1 | 0 | 1 | 0 0 0 1 | 1 | 1 | 0 | 0 |
| 137 | 1 0 0 1 0 0 0 1 | | | | | | | | 0 | 1 | 1 | 0 | 0 | 0 | 0 | 1 | 1 0 1 0 | 0 | 1 | 1 | 1 | 0 0 0 1 | 1 | 0 | 1 | 0 |
| 138 | 0 1 0 1 0 0 0 1 | | | | | | | | 1 | 0 | 1 | 1 | 0 | 0 | 1 | 1 | 0 1 1 0 | 1 | 0 | 0 | 0 | 0 0 0 1 | 1 | 0 | 1 | 0 |
| 139 | 1 1 0 1 0 0 0 1 | | | | | | | | 0 | 0 | 1 | 0 | 1 | 1 | 1 | 1 | 1 1 1 0 | 0 | 0 | 1 | 0 | 0 0 0 1 | 1 | 1 | 0 | 0 |
| 140 | 0 0 1 1 0 0 0 1 | | | | | | | | 1 | 1 | 0 | 1 | 0 | 1 | 1 | 0 | 0 0 1 0 | 1 | 1 | 0 | 0 | 1 0 0 1 | 0 | 1 | 1 | 1 |
| 141 | 1 0 1 1 0 0 0 1 | | | | | | | | 0 | 1 | 0 | 0 | 0 | 1 | 1 | 0 | 1 0 1 0 | 0 | 1 | 1 | 0 | 1 0 0 1 | 0 | 0 | 0 | 1 |
| 142 | 0 1 1 1 0 0 0 1 | | | | | | | | 1 | 0 | 0 | 1 | 0 | 1 | 0 | 0 | 0 1 1 0 | 1 | 0 | 0 | 1 | 1 0 0 1 | 0 | 0 | 0 | 1 |
| 143 | 1 1 1 1 0 0 0 1 | | | | | | | | 0 | 0 | 0 | 0 | 1 | 0 | 0 | 0 | 1 1 1 0 | 0 | 0 | 1 | 1 | 1 0 0 1 | 0 | 1 | 1 | 1 |
| 144 | 0 0 0 0 1 0 0 1 | | | | | | | | 1 | 0 | 1 | 0 | 1 | 0 | 0 | 1 | 0 0 0 0 | 1 | 0 | 1 | 1 | 0 1 0 1 | 1 | 1 | 1 | 0 |
| 145 | 1 0 0 0 1 0 0 1 | | | | | | | | 0 | 0 | 1 | 1 | 0 | 1 | 0 | 1 | 1 0 0 0 | 0 | 0 | 0 | 1 | 0 1 0 1 | 1 | 0 | 0 | 0 |
| 146 | 0 1 0 0 1 0 0 1 | | | | | | | | 1 | 1 | 1 | 0 | 0 | 1 | 1 | 1 | 0 1 0 0 | 1 | 1 | 1 | 0 | 0 1 0 1 | 1 | 0 | 0 | 0 |
| 147 | 1 1 0 0 1 0 0 1 | | | | | | | | 0 | 1 | 1 | 1 | 1 | 0 | 1 | 1 | 1 1 0 0 | 0 | 1 | 0 | 0 | 0 1 0 1 | 1 | 1 | 1 | 0 |

TABLE I-continued

| DATA WORD | STANDARD ERROR CORRECTING CODE | | | | | | | | | IMPROVED ERROR CORRECTING CODE | | | | | | | | | |
|---|---|---|---|---|---|---|---|---|---|---|---|---|---|---|---|---|---|---|---|
| | 1x | | | | | | | | | | 1y | | | | | 2y | | | |
| | | | | | 2x | | | | | | | | | | | | | | |
| x | 12345678 | A | B | C | D | E | F | G | H | 1247 | A | B | $\overline{D}$ | $\overline{G}$ | 3568 | C | E | $\overline{F}$ | $\overline{H}$ |
| 148 | 00101001 | 1 | 0 | 0 | 0 | 1 | 1 | 1 | 0 | 0000 | 1 | 0 | 1 | 0 | 1101 | 0 | 1 | 0 | 1 |
| 149 | 10101001 | 0 | 0 | 0 | 1 | 0 | 0 | 1 | 0 | 1000 | 0 | 0 | 0 | 0 | 1101 | 0 | 0 | 1 | 1 |
| 150 | 01101001 | 1 | 1 | 0 | 0 | 0 | 0 | 0 | 0 | 0100 | 1 | 1 | 1 | 1 | 1101 | 0 | 0 | 1 | 1 |
| 151 | 11101001 | 0 | 1 | 0 | 1 | 1 | 1 | 0 | 0 | 1100 | 0 | 1 | 0 | 1 | 1101 | 0 | 1 | 0 | 1 |
| 152 | 00011001 | 0 | 0 | 1 | 0 | 0 | 1 | 1 | 0 | 0010 | 0 | 0 | 1 | 0 | 0101 | 1 | 0 | 0 | 1 |
| 153 | 10011001 | 1 | 0 | 1 | 1 | 1 | 0 | 1 | 0 | 1010 | 1 | 0 | 0 | 0 | 0101 | 1 | 1 | 1 | 1 |
| 154 | 01011001 | 0 | 1 | 1 | 0 | 1 | 0 | 0 | 0 | 0110 | 0 | 1 | 1 | 1 | 0101 | 1 | 1 | 1 | 1 |
| 155 | 11011001 | 1 | 1 | 1 | 1 | 0 | 1 | 0 | 0 | 1110 | 1 | 1 | 0 | 1 | 0101 | 1 | 0 | 0 | 1 |
| 156 | 00111001 | 0 | 0 | 0 | 0 | 0 | 0 | 0 | 1 | 0010 | 0 | 0 | 1 | 1 | 1101 | 0 | 0 | 1 | 0 |
| 157 | 10111001 | 1 | 0 | 0 | 1 | 1 | 1 | 0 | 1 | 1010 | 1 | 0 | 0 | 1 | 1101 | 0 | 1 | 0 | 0 |
| 158 | 01111001 | 0 | 1 | 0 | 0 | 1 | 1 | 1 | 1 | 0110 | 0 | 1 | 1 | 0 | 1101 | 0 | 1 | 0 | 0 |
| 159 | 11111001 | 1 | 1 | 0 | 1 | 0 | 0 | 1 | 1 | 1110 | 1 | 1 | 0 | 0 | 1101 | 0 | 0 | 1 | 0 |
| 160 | 00000101 | 1 | 0 | 0 | 0 | 0 | 0 | 1 | 1 | 0000 | 1 | 0 | 1 | 0 | 0011 | 0 | 0 | 1 | 0 |
| 161 | 10000101 | 0 | 0 | 0 | 1 | 1 | 1 | 1 | 1 | 1000 | 0 | 0 | 0 | 0 | 0011 | 0 | 1 | 0 | 0 |
| 162 | 01000101 | 1 | 1 | 0 | 0 | 1 | 1 | 0 | 1 | 0100 | 1 | 1 | 1 | 1 | 0011 | 0 | 1 | 0 | 0 |
| 163 | 11000101 | 0 | 1 | 0 | 1 | 0 | 0 | 0 | 1 | 1100 | 0 | 1 | 0 | 1 | 0011 | 0 | 0 | 1 | 0 |
| 164 | 00100101 | 1 | 0 | 1 | 0 | 0 | 1 | 0 | 0 | 0000 | 1 | 0 | 1 | 1 | 1011 | 1 | 0 | 0 | 1 |
| 165 | 10100101 | 0 | 0 | 1 | 1 | 1 | 0 | 0 | 0 | 1000 | 0 | 0 | 0 | 1 | 1011 | 1 | 1 | 1 | 1 |
| 166 | 01100101 | 1 | 1 | 1 | 0 | 1 | 0 | 1 | 0 | 0100 | 1 | 1 | 1 | 0 | 1011 | 1 | 1 | 1 | 1 |
| 167 | 11100101 | 0 | 1 | 1 | 1 | 0 | 1 | 1 | 0 | 1100 | 0 | 1 | 0 | 0 | 1011 | 1 | 0 | 0 | 1 |
| 168 | 00010101 | 0 | 0 | 0 | 0 | 1 | 1 | 0 | 0 | 0010 | 0 | 0 | 1 | 1 | 0011 | 0 | 1 | 0 | 1 |
| 169 | 10010101 | 1 | 0 | 0 | 1 | 0 | 0 | 0 | 0 | 1010 | 1 | 0 | 0 | 1 | 0011 | 0 | 0 | 1 | 1 |
| 170 | 01010101 | 0 | 1 | 0 | 0 | 0 | 1 | 1 | 0 | 0110 | 0 | 1 | 1 | 0 | 0011 | 0 | 0 | 1 | 1 |
| 171 | 11010101 | 1 | 1 | 0 | 1 | 1 | 1 | 1 | 0 | 1110 | 1 | 1 | 0 | 0 | 0011 | 0 | 1 | 0 | 1 |
| 172 | 00110101 | 0 | 0 | 1 | 0 | 1 | 0 | 1 | 1 | 0010 | 0 | 0 | 1 | 0 | 1011 | 1 | 1 | 1 | 0 |
| 173 | 10110101 | 1 | 0 | 1 | 1 | 0 | 1 | 1 | 1 | 1010 | 1 | 0 | 0 | 0 | 1011 | 1 | 0 | 0 | 0 |
| 174 | 01110101 | 0 | 1 | 1 | 0 | 0 | 1 | 0 | 1 | 0110 | 0 | 1 | 1 | 1 | 1011 | 1 | 0 | 0 | 0 |
| 175 | 11110101 | 1 | 1 | 1 | 1 | 1 | 0 | 0 | 1 | 1110 | 1 | 1 | 0 | 1 | 1011 | 1 | 1 | 1 | 0 |
| 176 | 00001101 | 0 | 1 | 0 | 1 | 1 | 0 | 0 | 0 | 0000 | 0 | 1 | 0 | 1 | 0111 | 0 | 1 | 1 | 1 |
| 177 | 10001101 | 1 | 1 | 0 | 0 | 0 | 1 | 0 | 0 | 1000 | 1 | 1 | 1 | 1 | 0111 | 0 | 0 | 0 | 1 |
| 178 | 01001101 | 0 | 0 | 0 | 1 | 0 | 1 | 1 | 0 | 0100 | 0 | 0 | 0 | 0 | 0111 | 0 | 0 | 0 | 1 |
| 179 | 11001101 | 1 | 0 | 0 | 0 | 1 | 0 | 1 | 0 | 1100 | 1 | 0 | 1 | 0 | 0111 | 0 | 1 | 1 | 1 |
| 180 | 00101101 | 0 | 1 | 1 | 1 | 1 | 1 | 1 | 1 | 0000 | 0 | 1 | 0 | 0 | 1111 | 1 | 1 | 0 | 0 |
| 181 | 10101101 | 1 | 1 | 1 | 0 | 0 | 0 | 1 | 1 | 1000 | 1 | 1 | 1 | 0 | 1111 | 1 | 0 | 1 | 0 |
| 182 | 01101101 | 0 | 0 | 1 | 1 | 0 | 0 | 0 | 1 | 0100 | 0 | 0 | 0 | 1 | 1111 | 1 | 0 | 1 | 0 |
| 183 | 11101101 | 1 | 0 | 1 | 0 | 1 | 1 | 0 | 1 | 1100 | 1 | 0 | 1 | 1 | 1111 | 1 | 1 | 0 | 0 |
| 184 | 00011101 | 1 | 1 | 0 | 1 | 0 | 1 | 1 | 1 | 0010 | 1 | 1 | 0 | 0 | 0111 | 0 | 0 | 0 | 0 |
| 185 | 10011101 | 0 | 1 | 0 | 0 | 1 | 0 | 1 | 1 | 1010 | 0 | 1 | 1 | 0 | 0111 | 0 | 1 | 1 | 0 |
| 186 | 01011101 | 1 | 0 | 0 | 1 | 1 | 0 | 0 | 1 | 0110 | 1 | 0 | 0 | 1 | 0111 | 0 | 1 | 1 | 0 |
| 187 | 11011101 | 0 | 0 | 0 | 0 | 0 | 1 | 0 | 1 | 1110 | 0 | 0 | 1 | 1 | 0111 | 0 | 0 | 0 | 0 |
| 188 | 00111101 | 1 | 1 | 1 | 1 | 0 | 0 | 0 | 0 | 0010 | 1 | 1 | 0 | 1 | 1111 | 1 | 0 | 1 | 1 |
| 189 | 10111101 | 0 | 1 | 1 | 0 | 1 | 1 | 0 | 0 | 1010 | 0 | 1 | 1 | 1 | 1111 | 1 | 1 | 0 | 1 |
| 190 | 01111101 | 1 | 0 | 1 | 1 | 1 | 1 | 1 | 0 | 0110 | 1 | 0 | 0 | 0 | 1111 | 1 | 1 | 0 | 1 |
| 191 | 11111101 | 0 | 0 | 1 | 0 | 0 | 0 | 1 | 0 | 1110 | 0 | 0 | 1 | 0 | 1111 | 1 | 0 | 1 | 1 |
| 192 | 00000011 | 1 | 0 | 0 | 1 | 0 | 1 | 1 | 0 | 0001 | 1 | 0 | 0 | 0 | 0001 | 0 | 0 | 0 | 1 |
| 193 | 10000011 | 0 | 0 | 0 | 0 | 1 | 0 | 1 | 0 | 1001 | 0 | 0 | 1 | 0 | 0001 | 0 | 1 | 1 | 1 |
| 194 | 01000011 | 1 | 1 | 0 | 1 | 1 | 0 | 0 | 0 | 0101 | 1 | 1 | 0 | 1 | 0001 | 0 | 1 | 1 | 1 |
| 195 | 11000011 | 0 | 1 | 0 | 0 | 0 | 1 | 0 | 0 | 1101 | 0 | 1 | 1 | 1 | 0001 | 0 | 0 | 0 | 1 |
| 196 | 00100011 | 1 | 0 | 1 | 1 | 0 | 0 | 0 | 1 | 0001 | 1 | 0 | 0 | 1 | 1001 | 1 | 0 | 1 | 0 |
| 197 | 10100011 | 0 | 0 | 1 | 0 | 1 | 1 | 0 | 1 | 1001 | 0 | 0 | 1 | 1 | 1001 | 1 | 1 | 0 | 0 |
| 198 | 01100011 | 1 | 1 | 1 | 1 | 1 | 1 | 1 | 1 | 0101 | 1 | 1 | 0 | 0 | 1001 | 1 | 1 | 0 | 0 |
| 199 | 11100011 | 0 | 1 | 1 | 0 | 0 | 0 | 1 | 1 | 1101 | 0 | 1 | 1 | 0 | 1001 | 1 | 0 | 1 | 0 |
| 200 | 00010011 | 0 | 0 | 0 | 1 | 1 | 0 | 0 | 1 | 0011 | 0 | 0 | 0 | 1 | 0001 | 0 | 1 | 1 | 0 |
| 201 | 10010011 | 1 | 0 | 0 | 0 | 0 | 1 | 0 | 1 | 1011 | 1 | 0 | 1 | 1 | 0001 | 0 | 0 | 0 | 0 |
| 202 | 01010011 | 0 | 1 | 0 | 1 | 0 | 1 | 1 | 1 | 0111 | 0 | 1 | 0 | 0 | 0001 | 0 | 0 | 0 | 0 |
| 203 | 11010011 | 1 | 1 | 0 | 0 | 1 | 0 | 1 | 1 | 1111 | 1 | 1 | 1 | 0 | 0001 | 0 | 1 | 1 | 0 |
| 204 | 00110011 | 0 | 0 | 1 | 1 | 1 | 1 | 1 | 0 | 0011 | 0 | 0 | 0 | 0 | 1001 | 1 | 1 | 0 | 1 |
| 205 | 10110011 | 1 | 0 | 1 | 0 | 0 | 0 | 1 | 0 | 1011 | 1 | 0 | 1 | 0 | 1001 | 1 | 0 | 1 | 1 |
| 206 | 01110011 | 0 | 1 | 1 | 1 | 0 | 0 | 0 | 0 | 0111 | 0 | 1 | 0 | 1 | 1001 | 1 | 0 | 1 | 1 |
| 207 | 11110011 | 1 | 1 | 1 | 0 | 1 | 1 | 0 | 0 | 1111 | 1 | 1 | 1 | 1 | 1001 | 1 | 1 | 0 | 1 |
| 208 | 00001011 | 0 | 1 | 0 | 0 | 1 | 1 | 0 | 1 | 0001 | 0 | 1 | 1 | 1 | 0101 | 0 | 1 | 0 | 0 |
| 209 | 10001011 | 1 | 1 | 0 | 1 | 0 | 0 | 0 | 1 | 1001 | 1 | 1 | 0 | 1 | 0101 | 0 | 0 | 1 | 0 |
| 210 | 01001011 | 0 | 0 | 0 | 0 | 0 | 0 | 1 | 1 | 0101 | 0 | 0 | 1 | 0 | 0101 | 0 | 0 | 1 | 0 |
| 211 | 11001011 | 1 | 0 | 0 | 1 | 1 | 1 | 1 | 1 | 1101 | 1 | 0 | 0 | 0 | 0101 | 0 | 1 | 0 | 0 |
| 212 | 00101011 | 0 | 1 | 1 | 0 | 1 | 0 | 1 | 0 | 0001 | 0 | 1 | 1 | 0 | 1101 | 1 | 1 | 1 | 1 |
| 213 | 10101011 | 1 | 1 | 1 | 1 | 0 | 1 | 1 | 0 | 1001 | 1 | 1 | 0 | 0 | 1101 | 1 | 0 | 0 | 1 |
| 214 | 01101011 | 0 | 0 | 1 | 0 | 0 | 1 | 0 | 0 | 0101 | 0 | 0 | 1 | 1 | 1101 | 1 | 0 | 0 | 1 |
| 215 | 11101011 | 1 | 0 | 1 | 1 | 1 | 0 | 0 | 0 | 1101 | 1 | 0 | 0 | 1 | 1101 | 1 | 1 | 1 | 1 |
| 216 | 00011011 | 1 | 1 | 0 | 0 | 0 | 0 | 1 | 0 | 0011 | 1 | 1 | 1 | 0 | 0101 | 0 | 0 | 1 | 0 |
| 217 | 10011011 | 0 | 1 | 0 | 1 | 1 | 1 | 1 | 0 | 1011 | 0 | 1 | 0 | 0 | 0101 | 0 | 1 | 0 | 0 |
| 218 | 01011011 | 1 | 0 | 0 | 0 | 1 | 1 | 0 | 0 | 0111 | 1 | 0 | 1 | 1 | 0101 | 0 | 1 | 0 | 0 |
| 219 | 11011011 | 0 | 0 | 0 | 1 | 0 | 0 | 0 | 0 | 1111 | 0 | 0 | 0 | 1 | 0101 | 0 | 0 | 1 | 0 |
| 220 | 00111011 | 1 | 1 | 1 | 0 | 0 | 1 | 0 | 1 | 0011 | 1 | 1 | 1 | 0 | 1101 | 1 | 0 | 0 | 0 |
| 221 | 10111011 | 0 | 1 | 1 | 1 | 1 | 0 | 0 | 1 | 1011 | 0 | 1 | 0 | 1 | 1101 | 1 | 1 | 1 | 0 |
| 222 | 01111011 | 1 | 0 | 1 | 0 | 1 | 0 | 1 | 1 | 0111 | 1 | 0 | 1 | 0 | 1101 | 1 | 1 | 1 | 0 |
| 223 | 11111011 | 0 | 0 | 1 | 1 | 0 | 1 | 1 | 1 | 1111 | 0 | 0 | 0 | 0 | 1101 | 1 | 0 | 0 | 0 |
| 224 | 00000111 | 0 | 1 | 1 | 0 | 0 | 1 | 1 | 1 | 0001 | 0 | 1 | 1 | 0 | 0011 | 1 | 0 | 0 | 0 |
| 225 | 10000111 | 1 | 1 | 1 | 1 | 1 | 0 | 1 | 1 | 1001 | 1 | 1 | 0 | 0 | 0011 | 1 | 1 | 1 | 0 |

TABLE I-continued

| DATA WORD | STANDARD ERROR CORRECTING CODE | | | | | | | | | | | | | | | | | IMPROVED ERROR CORRECTING CODE | | | | | | | | | | | | |
|---|---|---|---|---|---|---|---|---|---|---|---|---|---|---|---|---|---|---|---|---|---|---|---|---|---|---|---|---|---|
| | $1x$ | | | | | | | | $2x$ | | | | | | | | | $1y$ | | | | | | | $2y$ | | | | |
| x | 1 2 3 4 5 6 7 8 | | | | | | | | A | B | C | D | E | F | G | H | 1 2 4 7 | | | | A | B | $\bar{D}$ | $\bar{G}$ | 3 5 6 8 | C | E | F | $\bar{H}$ |
| 226 | 0 1 0 0 0 1 1 1 | | | | | | | | 0 | 0 | 1 | 0 | 1 | 0 | 0 | 1 | 0 1 0 1 | | | | 0 | 0 | 1 | 1 | 0 0 1 1 | 1 | 1 | 1 | 0 |
| 227 | 1 1 0 0 0 1 1 1 | | | | | | | | 1 | 0 | 1 | 1 | 0 | 1 | 0 | 1 | 1 1 0 1 | | | | 1 | 0 | 0 | 1 | 0 0 1 1 | 1 | 0 | 0 | 0 |
| 228 | 0 0 1 0 0 1 1 1 | | | | | | | | 0 | 1 | 0 | 0 | 0 | 0 | 0 | 0 | 0 0 0 1 | | | | 0 | 1 | 1 | 1 | 1 0 1 1 | 0 | 0 | 1 | 1 |
| 229 | 1 0 1 0 0 1 1 1 | | | | | | | | 1 | 1 | 0 | 1 | 1 | 1 | 0 | 0 | 1 0 0 1 | | | | 1 | 1 | 0 | 1 | 1 0 1 1 | 0 | 1 | 0 | 1 |
| 230 | 0 1 1 0 0 1 1 1 | | | | | | | | 0 | 0 | 0 | 0 | 1 | 1 | 1 | 0 | 0 1 0 1 | | | | 0 | 0 | 1 | 0 | 1 0 1 1 | 0 | 1 | 0 | 1 |
| 231 | 1 1 1 0 0 1 1 1 | | | | | | | | 1 | 0 | 0 | 1 | 0 | 0 | 1 | 0 | 1 1 0 1 | | | | 1 | 0 | 0 | 0 | 1 0 1 1 | 0 | 0 | 1 | 1 |
| 232 | 0 0 0 1 0 1 1 1 | | | | | | | | 1 | 1 | 1 | 0 | 1 | 0 | 0 | 0 | 0 0 1 1 | | | | 1 | 1 | 1 | 1 | 0 0 1 1 | 1 | 1 | 1 | 1 |
| 233 | 1 0 0 1 0 1 1 1 | | | | | | | | 0 | 1 | 1 | 1 | 0 | 1 | 0 | 0 | 1 0 1 1 | | | | 0 | 1 | 0 | 1 | 0 0 1 1 | 1 | 0 | 0 | 1 |
| 234 | 0 1 0 1 0 1 1 1 | | | | | | | | 1 | 0 | 1 | 0 | 0 | 1 | 1 | 0 | 0 1 1 1 | | | | 1 | 0 | 1 | 0 | 0 0 1 1 | 1 | 0 | 0 | 1 |
| 235 | 1 1 0 1 0 1 1 1 | | | | | | | | 0 | 0 | 1 | 1 | 1 | 0 | 1 | 0 | 1 1 1 1 | | | | 0 | 0 | 0 | 0 | 0 0 1 1 | 1 | 1 | 1 | 1 |
| 236 | 0 0 1 1 0 1 1 1 | | | | | | | | 1 | 1 | 0 | 0 | 1 | 1 | 1 | 1 | 0 0 1 1 | | | | 1 | 1 | 1 | 0 | 1 0 1 1 | 0 | 1 | 0 | 0 |
| 237 | 1 0 1 1 0 1 1 1 | | | | | | | | 0 | 1 | 0 | 1 | 0 | 0 | 1 | 1 | 1 0 1 1 | | | | 0 | 1 | 0 | 0 | 1 0 1 1 | 0 | 0 | 1 | 0 |
| 238 | 0 1 1 1 0 1 1 1 | | | | | | | | 1 | 0 | 0 | 0 | 0 | 0 | 0 | 1 | 0 1 1 1 | | | | 1 | 0 | 1 | 1 | 1 0 1 1 | 0 | 0 | 1 | 0 |
| 239 | 1 1 1 1 0 1 1 1 | | | | | | | | 0 | 0 | 0 | 1 | 1 | 1 | 0 | 1 | 1 1 1 1 | | | | 0 | 0 | 0 | 1 | 1 0 1 1 | 0 | 1 | 0 | 0 |
| 240 | 0 0 0 0 1 1 1 1 | | | | | | | | 1 | 0 | 1 | 1 | 1 | 1 | 0 | 0 | 0 0 0 1 | | | | 1 | 0 | 0 | 1 | 0 1 1 1 | 1 | 1 | 0 | 1 |
| 241 | 1 0 0 0 1 1 1 1 | | | | | | | | 0 | 0 | 1 | 0 | 0 | 0 | 0 | 0 | 1 0 0 1 | | | | 0 | 0 | 1 | 1 | 0 1 1 1 | 1 | 0 | 1 | 1 |
| 242 | 0 1 0 0 1 1 1 1 | | | | | | | | 1 | 1 | 1 | 1 | 0 | 0 | 1 | 0 | 0 1 0 1 | | | | 1 | 1 | 0 | 0 | 0 1 1 1 | 1 | 0 | 1 | 1 |
| 243 | 1 1 0 0 1 1 1 1 | | | | | | | | 0 | 1 | 1 | 0 | 1 | 1 | 1 | 0 | 1 1 0 1 | | | | 0 | 1 | 1 | 0 | 0 1 1 1 | 1 | 1 | 0 | 1 |
| 244 | 0 0 1 0 1 1 1 1 | | | | | | | | 1 | 0 | 0 | 1 | 1 | 0 | 1 | 1 | 0 0 0 1 | | | | 1 | 0 | 0 | 0 | 1 1 1 1 | 0 | 1 | 1 | 0 |
| 245 | 1 0 1 0 1 1 1 1 | | | | | | | | 0 | 0 | 0 | 0 | 0 | 1 | 1 | 1 | 1 0 0 1 | | | | 0 | 0 | 1 | 0 | 1 1 1 1 | 0 | 0 | 0 | 0 |
| 246 | 0 1 1 0 1 1 1 1 | | | | | | | | 1 | 1 | 0 | 1 | 0 | 1 | 0 | 1 | 0 1 0 1 | | | | 1 | 1 | 0 | 1 | 1 1 1 1 | 0 | 0 | 0 | 0 |
| 247 | 1 1 1 0 1 1 1 1 | | | | | | | | 0 | 1 | 0 | 0 | 1 | 0 | 0 | 1 | 1 1 0 1 | | | | 0 | 1 | 1 | 1 | 1 1 1 1 | 0 | 1 | 1 | 0 |
| 248 | 0 0 0 1 1 1 1 1 | | | | | | | | 0 | 0 | 1 | 1 | 0 | 0 | 1 | 1 | 0 0 1 1 | | | | 0 | 0 | 0 | 0 | 0 1 1 1 | 1 | 0 | 1 | 0 |
| 249 | 1 0 0 1 1 1 1 1 | | | | | | | | 1 | 0 | 1 | 0 | 1 | 1 | 1 | 1 | 1 0 1 1 | | | | 1 | 0 | 1 | 0 | 0 1 1 1 | 1 | 1 | 0 | 0 |
| 250 | 0 1 0 1 1 1 1 1 | | | | | | | | 0 | 1 | 1 | 1 | 1 | 1 | 0 | 1 | 0 1 1 1 | | | | 0 | 1 | 0 | 1 | 0 1 1 1 | 1 | 1 | 0 | 0 |
| 251 | 1 1 0 1 1 1 1 1 | | | | | | | | 1 | 1 | 1 | 0 | 0 | 0 | 0 | 1 | 1 1 1 1 | | | | 1 | 1 | 1 | 1 | 0 1 1 1 | 1 | 0 | 1 | 0 |
| 252 | 0 0 1 1 1 1 1 1 | | | | | | | | 0 | 0 | 0 | 1 | 0 | 1 | 0 | 0 | 0 0 1 1 | | | | 0 | 0 | 1 | 1 | 1 1 1 1 | 0 | 0 | 0 | 1 |
| 253 | 1 0 1 1 1 1 1 1 | | | | | | | | 1 | 0 | 0 | 0 | 1 | 0 | 0 | 0 | 1 0 1 1 | | | | 1 | 0 | 1 | 1 | 1 1 1 1 | 0 | 1 | 1 | 1 |
| 254 | 0 1 1 1 1 1 1 1 | | | | | | | | 0 | 1 | 0 | 1 | 1 | 0 | 1 | 0 | 0 1 1 1 | | | | 0 | 1 | 0 | 0 | 1 1 1 1 | 0 | 1 | 1 | 1 |
| 255 | 1 1 1 1 1 1 1 1 | | | | | | | | 1 | 1 | 0 | 0 | 0 | 1 | 1 | 0 | 1 1 1 1 | | | | 1 | 1 | 1 | 0 | 1 1 1 1 | 0 | 0 | 0 | 1 |

The conventional error correcting code representation of each data word, x, consists of 16 bits which are divided into two groups which are shown in columns $^1X$ and $^2X$. The 8 bits of $^1X$ are labeled 1 through 8, respectively, and the 8 bits of $^2X$ are labeled "A" through "H". As can be seen from Table I, $^1X$ and $^2X$ both consist of all "0" bits for x=0. Hence, this code is not acceptable for use in a T1 transmission system.

As pointed out above, prior art encoding schemes force the most significant bit of x to be a "1" to overcome this problem. This is equivalent to allowing only the x values of 128 through 255. Since $^1X$ and $^2X$ do not contain all zeros for x values of 128 to 255, this restriction solves the problem in question. However, only 7 bits of data are transmitted for each 16 bits actually sent over the T1 facility, instead of the 8 bits that would be sent in the absence of the requirement that neither $^1X$ and $^2X$ be all zeros.

The improved error correcting code according to the present invention shown in Table I also consists of two 8-bit groups of data bits, $^1Y$ and $^2Y$. The data in any given bit position in the improved error correcting code consists of the data in a corresponding position in the conventional error correcting code or the complement thereof. The correspondences in question are shown above each bit position in the columns for $^1Y$ and $^2Y$ in Table I. For example, the data in the first bit position of $^2Y$ is the data from the third bit position of $^1X$ in the conventional error correcting code. The data in the seventh bit position of $^1Y$ is the complement of the data in the fourth bit position in $^2X$ in the conventional error correcting code.

In an error correcting code according to the present invention, there is no value of x for which either $^1X$ or $^2X$ is all zeros. Hence the improved error correcting code according to the present invention is suitable for use in transmitting data over the T1 network described in FIG. 1 without the need to restrict the x data values.

It should be noted that a transformation such as that shown in Table I can not always be found. That is, it is not always possible to construct a transformation of a conventional error correcting code that involves interchanging the data in various bit positions, either with or without complementing said data such that the resultant code does not have at least one value of x for which all zeros would be sent on one of the two channels. For example, it can be shown by exhaustive computer searching that no such transformation exists for the conventional BCH (6,3) error correcting code. Such exhaustive calculations are not possible for larger error correcting codes.

The need to improve the error rates by a factor of 100,000 in T1 based data transmission systems dictates that codes such as the (16,8) error correcting code shown in Table I must be used. The ability of an error correcting code to correct errors is related to the "Hamming Distance" associated with the code. To obtain the above error correction, a code with a Hamming Distance of at least 5 is needed. This imposes a need to use a large code such as the (16,8) code.

The number of possible transformations based on rearranging the data bit positions and complementing the data in selected positions is too large to search exhaustively for a (16,8) or larger code. The number of possible transformations is larger than $10^{18}$ for a 16-bit code. Testing this many codes for a code having the desired density of "1" bits is not economically feasible.

In the present invention, this number may be dramatically reduced using the following rules and observations. First, a transformation that merely interchanges the data in two bit positions within $^1X$ to produce $^1Y$ will not transform an unacceptable error correcting code into an acceptable error correcting code. In an unacceptable error correcting code at least one of $^1X$ or $^2X$ is all zeros for some value of x. Merely rearranging the order of the bits in $^1X$ or $^2X$ will not introduce a 1 into the $^1X$ or $^2X$ value in question. Similarly, a transformation that interchanges the data in two bit positions within $^2X$ to produce $^2Y$ will not transform an unacceptable error correcting code into an acceptable error correcting code in which neither $^1Y$ or $^2Y$ contains all zeros.

It follows from this first observation that the transformation must at least interchange data in two bit positions, one position being in $^1X$ and one position being in $^2X$. However, this will not convert an unacceptable error correcting code in which $^1X$ and $^2X$ are all zeros for some value of x, e.g., the code shown in Table I, into an acceptable error correcting code.

Hence, to generate an acceptable error correcting code from a code in which both $^1X$ and $^2X$ contain all zeros for some value of x, the $^1Y$ and $^2Y$ obtained after interchanging the data in the two bit positions described above must then have the data in at least one bit position complemented as well.

It should be noted that a transformation in which $^1Y$ is obtained by merely complementing the data in one bit position in $^1X$ is not sufficient to produce a satisfactory code. This can be most easily seen with reference to a BCH (16,8) code in which $^1X$ is x, i.e., the code shown in Table I. Suppose the transformation complements the data in the kth bit position of $^1X$ to produce $^1Y$. Each of $^1X$ and $^2X$ can take on 256 different values. Hence, there is always an x for which $^1X$ has zeros at all bit positions except bit position k which contains a 1. When the data in the transformation complements the data in the kth bit position, it will convert this $^1X$ to all zeros. Hence, both an interchange of bit positions and the complementing of data in at least one bit position is necessary to convert a code such as that shown in Table I into an acceptable error correcting code.

The above observations reduce the number of possible transformations that must be searched to find a satisfactory error correcting code to less than 2 million for a (16,8) error correcting code. This is a sufficiently small number to allow the search to be carried out on conventional computers.

A transformation that conforms to the above observations is equivalent to two transformations being performed on a conventional error correcting code that maps an n-bit data word into two encoded data words $^1X$ and $^2X$. The first transformation consists of exchanging the data in one or more bit positions of $^1X$ with that in one or more corresponding bit positions in $^2X$. The second transformation consists of complementing the data stored in one or more bit positions in $^1X$ or $^2X$. It may be shown that it is sufficient to limit the complementation transformation to bit positions whose data was originally stored in $^2X$ in the conventional error correcting code. However, it will be apparent to those skilled in the art that a satisfactory second transformation may be constructed by complementing the data stored in bit positions whose data was originally stored in $^1X$.

The order in which these transformations are applied to the conventional error correcting code is not important. The error correcting code obtained by exchanging data in the various bit positions and then complementing the data stored in predefined bit positions is the same as that obtained by reversing the order of the operations.

A computer algorithm for searching for a valid transformation based on these observations may be constructed as follows. The algorithm starts with a transformation in which each possible data value x is transformed into two words $^1X$ and $^2X$ and for which $^1X$ or $^2X$ is 0 for some value of x. $^1X$ and $^2X$ are transformed into $^1Y$ and $^2Y$ by interchanging one or more bit positions in $^1X$ and $^2X$ and by complementing the data originally in selected bit positions of $^2X$. For example, in the transformation shown in Table I, $^1Y$ is formed by copying the data in the first, second, fourth, and seventh bit positions of $^1X$ and the first, second, fourth, and seventh bit positions of $^2X$. The data in the remaining bit positions of $^1X$ and $^2X$ are copied into $^2Y$. Before copying the data in question, the data in the fourth, sixth, seventh, and eighth bit positions of $^2X$ is replaced by the complement thereof.

In the most general case, x would be an n-bit binary word, $^1X$ would be a binary word having $n_1$ bits and $^2X$ would be a binary word having $n_2$ $p$ bits. Similarly, $^1Y$ would have $n_1$ bits and $^2Y$ would have $n_2$ $p$ bits. In the preferred embodiment, $n_1 = n_2$ $p = n$.

The number of bit positions that are interchanged will be referred to as P in the following discussion. P must be greater than or equal to one, and P must be less than $n_1$. For example, if P were equal to two, $^1Y$ would be formed from the data in P−2 bits in $^1X$ and 2 bits in $^2X$. $^2Y$ would then be formed from the data in the bit positions not used in forming $^1Y$.

As noted above, the order of the bits is irrelevant in finding a valid transformation. Once a valid transformation is found, the order of the bits in either $^1Y$ or $^2Y$ may be changed without introducing a $^1Y$ or $^2Y$ which is all zeros.

The identity of the bit positions in $^2X$ for which the data values are to be complemented before moving said data to its new position in $^1Y$ or $^2Y$ are defined with reference to an $n_2$ $p$-bit integer N which is restricted to positive values. For any given value of N, the binary representation of N is examined. For each bit in said binary representation that is a "1", the corresponding bit position in $^2X$ is to be complemented. For example, if N=3, the data in each of the first and second bit positions in $^2X$ will be complemented before moving that data to its new location in $^1Y$ or $^2Y$. Since N is restricted from taking the value 0, at least one bit position in $^2X$ will have its data complemented before said data is moved.

Figure 2:
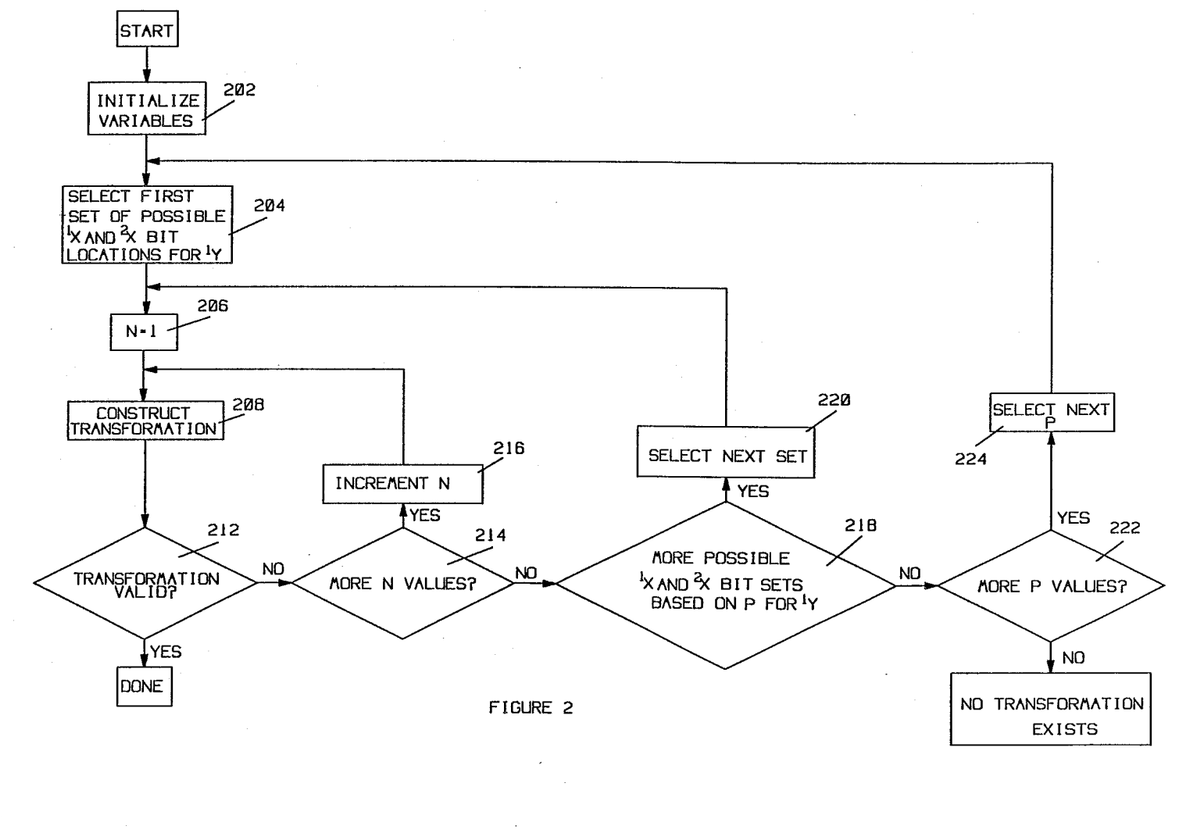
FIG. 2 is a flow chart for a computer algorithm for generating an error correcting code according to the present invention.

FIG. 2 is a flow chart of a computer program for carrying out a search for a valid transformation according to the present invention. The program starts by initializing the various variables as shown at 202. P is initially set to one. The values for the transformation of x to $^1X$ and $^2X$ are initialized. For the current choice of P, the first possible choice for bit positions to be interchanged to form $^1Y$ are then selected as shown at 204. Next, the first value for N is chosen as shown at 206.

These values define a transformation. The transformation in question is constructed as shown at 208 and then tested as shown at 212. The test consists of transforming each possible value of x to the corresponding values of $^1Y$ and $^2Y$ and then testing $^1Y$ and $^2Y$. If either $^1Y$ or $^2Y$ is 0, the transformation is not valid. Similarly if $^1Y$ or $^2Y$ are all ones for some value of x, the transformation is not valid. This latter restriction is needed since the synchronization circuits utilize a transition between a 0 and a 1 to correct their synchronization. If the transformation is valid, the program terminates.

If the transformation is not valid, the next possible value of N is chosen and the next transformation constructed and tested. If the last value of N was the maximum value for N, the next set of bit positions that can be exchanged is chosen to replace the last set as shown at 218 and 220. If all of the possible sets for the current P value have been examined, P is incremented as shown at 222 and 224. If the last value of P was $n_1-1$, then no valid transformation exists.

It will be apparent to those skilled in the art that other transformations can also be used to construct an error correcting code according to the present invention. For example, the bit positions that are complemented could be chosen from $^1X$ instead of $^2X$. The only requirement of the transformation is that it has a defined inverse and that it does not produce a set of $^1Y$ and $^2Y$ values that are all ones or all zeros.

Figure 3:
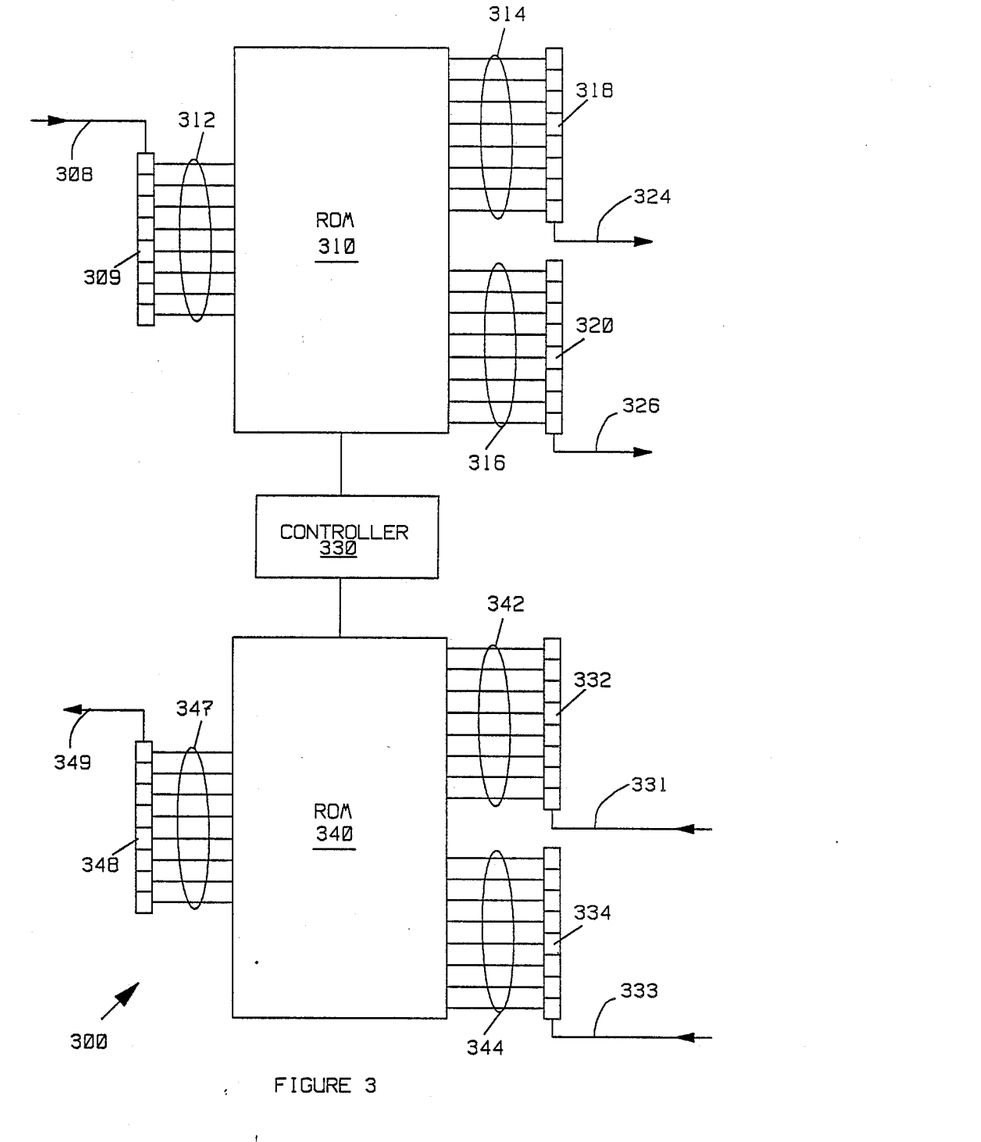
FIG. 3 is a block diagram of an error correcting circuit according to the present invention.

A block diagram of an embodiment of an error correcting circuit according to the present invention is shown in FIG. 3 at 300. The embodiment in question encrypts 8-bit data words into two 8-bit transmission words. Error correcting circuit 300 may be utilized in a T-carrier transmission system in place of error correcting circuit 80 shown in FIG. 1. Error correcting circuit 300 utilizes an error correcting code according to the present invention to encrypt digital data consisting of a bit serial data stream on a first input line 308 into two encrypted bit serial data streams on output lines 324 and 326, respectively. The encrypted data streams may then be sent over a T-carrier network by coupling said encrypted data streams to an interface unit such as interface unit 20 shown in FIG. 1.

The encryption is carried out with the aid of a ROM 310 that is used to store an error correcting code according to the present invention. ROM 310 is a 256×16-bit memory. ROM 310 stores the two 8-bit transmission words corresponding to each possible value of the 8-bit data words on input line 308. The first transmission word is stored in the most significant 8bits of the 16 bits in question, and the second transmission word is stored in the least significant 8 bits.

Each 8-bit data word present on input line 308 is shifted into a shift register 309. The outputs of the individual cells in shift register 309 are coupled to the address inputs 312 of ROM 310. When a data word has been shifted into shift register 309 under the control of controller 320, controller 320 initiates a memory cycle that causes ROM 310 to place the data stored at the address specified by the data word in question on data output lines 314 and 316. This data is loaded into shift registers 318 and 320. Finally, the data in shift registers 318 and 320 is shifted out onto output lines 324 and 326, respectively. These output lines serve functions analogous to output lines connecting error correcting circuit 80 to interface unit 20 in FIG. 1.

Decryption is carried out in an analogous manner. A ROM 340 is used to store the correspondence between each possible pair of 8-bit transmission words and the 8-bit data word to be assigned thereto. ROM 340 is $2^1$6×8-bit memory. The least significant 8 bits of the address of an 8-bit data word in ROM 340 are coupled to a first shift register 334. The most significant 8 bits of said address are coupled to a second shift register 332. Two 8-bit encrypted transmission words are loaded into shift registers 332 and 334 by shifting bit serial data streams present on input lines 331 and 333 into shift registers 332 and 334, respectively. When the shift registers in question are full, controller 330 initiates a memory cycle in ROM 340 that causes the 8-bit data word stored at the address specified by the data in shift registers 332 and 334 to be loaded into shift register 348 which is connected to the data lines 347 of ROM 340. Finally, controller 330 shifts the data that was loaded into shift register 348 onto output line 349.

Error correcting circuit 300 has the advantage of being usable with any error correcting code, since the entire code is stored in ROMs. However, it requires a large ROM 340 which detracts from this feature.

In the preferred embodiment of the present invention, the error correcting code is derived from a conventional cyclic error code. Cyclic error codes are well known to those skilled in the art. These codes have the advantage of being capable of generation using relatively simple circuitry. For example, given an 8-bit data word, a 16-bit encrypted transmission word can be generated using circuitry consisting of shift registers and exclusive OR circuits. This 16-bit encrypted transmission word can then be divided into two 8-bit transmission words, such as $1\times$ and $2\times$ shown in Table I. These transmission words are then transformed to form a code according to the present invention. Decryption can also be carried out in this type of simple circuitry. Hence, there is no need to store the entire code as a table in a ROM, which reduces the hardware costs associated with the present invention.

Figure 4:
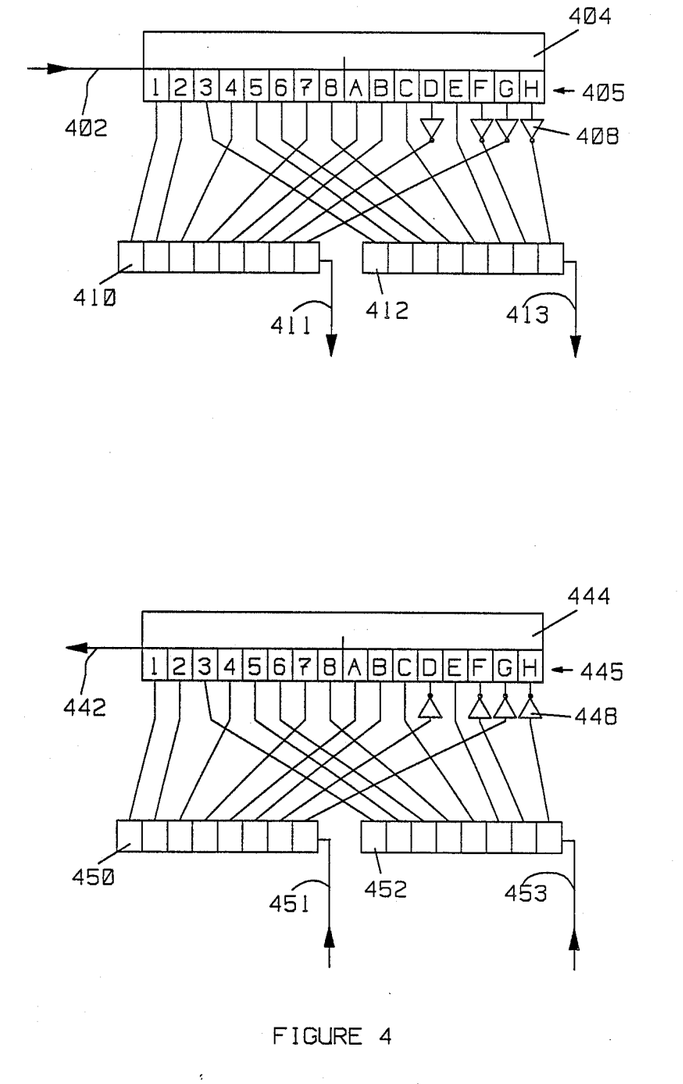
FIG. 4 is a block diagram of the preferred embodiment of an error correcting circuit according to the present invention.

A block diagram of the preferred embodiment of an error correcting circuit according to the present invention for converting 8-bit data words into two 8-bit transmission words suitable for transmission in a T-carrier facility is shown in FIG. 4. The specific error correcting codes illustrated in FIG. 4 are those shown in Table I.

Data to be transmitted through the T-carrier facility is received in bit serial form on an input line 402. This data is received by cyclic code generating circuit 404 which converts each 8-bit data word into a 16-bit encrypted word which is stored in a 16-bit register 405. The individual bits of register 405 are labeled 1 through 8 and A through H. The 16-bit encrypted word stored in register 405 is transformed into two transmission words by connecting each bit in register 405 to a corresponding bit in one of two shift registers 410 and 412. Those bit positions in register 405 that are to be complemented are connected to the corresponding bit positions in the shift registers through inverters of which inverter 408 is typical. These connections form a hardwired transformation of the conventional error correcting code to an error correcting code according to the present invention.

The transformed error correcting code is then shifted out onto two lines 411 and 413 which are connected to the corresponding two channels of the T-carrier facility. The shifting operation can be controlled by code generation circuit 404 or by an independent controller.

Data is received from the T-carrier facility and decoded in an analogous manner. Two bit serial data streams on input lines 451 and 453, one from each of the two channels in the T-carrier facility assigned to the digital data user connected to the present invention, are shifted into shift registers 450 and 452, respectively. When these shift registers are full, the data therein is transferred to a 16-bit register 445 in a cyclic code decoding circuit 444. The data in question is transferred by connecting the individual bits of shift registers 450 and 452 to register 445 such that the inverse of the transformation between register 405 and shift registers 410 and 412 is performed. Once loaded, the contents of register 445 are decoded using the conventional cyclic code decoding circuitry. The resulting 8-bit data word is then shifted out onto output line 442 which is connected to the digital data user in question.

Although the above described embodiment of the present invention converts 8-bit data words to two 8-bit transmission words and vice versa, it will be apparent to those skilled in the art that other word sizes may be used for both the data words and the transmission words. Similarly, the number of transmission words may be greater than two. In this case, additional channels in the T-carrier facility must be assigned to each digital data user.

Accordingly, an improved error correcting circuit utilizing an improved error correcting code has been described. It will be apparent to those skilled in the art that various modifications may be made without departing from the invention as taught herein. Hence, the present invention is to be limited only by the following claims.

What is claimed is:

1. An error correcting circuit comprising:
   means for receiving an n-bit received digital word, including means for coupling said error correcting circuit to an incoming user line;
   means for transmitting first and second transmission encrypted words on first and second outgoing transmission lines, said first transmission encrypted word having $n_1$ bits and said second transmission encrypted word having $n_2$ bits, said transmitting means including means for encrypting said received digital word according to an error correcting code to form said first and second transmission encrypted words, wherein said first and second transmission encrypted words are different from 0 for all possible values of said n-bit digital word; and
   means for receiving first and second reception encrypted words on first and second incoming transmission lines, respectively, said first reception encrypted word having $n_1$ bits and said second reception encrypted word having $n_2$ bits, said receiving means including means for decrypting said first and second reception encrypted words using said error correcting code to form an n-bit transmitted digital word and means for coupling said n-bit transmitted digital word to an outgoing user line.

2. The error correcting circuit of claim 1 wherein $n_1 = n_2 = n$.

3. The error correcting circuit of claim 2 wherein said transmitting means comprises a first storage means for storing a first table of code values, said first storage means comprising
   memory means for storing $2^n$ words, each said stored word comprising 2n bits;
   address means coupled to said incoming user line for specifying one of said stored words in response to an n-bit word being coupled thereto; and
   output means for coupling a first word comprising the first n bits of said specified stored data word to said first outgoing transmission line and means for coupling a second word comprising the second n bits of said specified stored data word to said second outgoing transmission line.

4. The error correcting circuit of claim 3 wherein said receiving means comprises a second storage means for storing a second table of code values, said second storage means comprising:
   memory means for storing $2^{2n}$ words, each said stored word comprising n bits;
   address means for specifying one of said words in response to two n-bit words being coupled thereto;
   means coupled to said first and second incoming transmission lines for coupling first and second received encrypted words to said address means; and
   output means for coupling the storage word specified by said address means to said outgoing user line.

5. The error correcting circuit of claim 2 wherein said transmitting means comprises:
   means coupled to said incoming user line for receiving an n-bit word;
   first, second, third, and fourth registers, each said register comprising means for storing an n-bit data word;
   means for converting said n-bit word to first and second n-bit encrypted data words using a cyclic error correcting code and for storing said first and second encrypted data words in said first and second registers;
   means for defining a one to one correspondence between the bits of said first and second registers and the bits of said third and fourth registers including means for transferring the data stored in each bit of said first and second registers to a corresponding bit in either said third or fourth registers, wherein the data in at least one bit of said first register is stored in a corresponding bit in said fourth register and the data in at least one bit of said second register is stored in a corresponding bit in said fourth register, and wherein, said transferring means further comprises means for complementing the data in at least one bit of said third or fourth registers; and
   means for coupling the data stored in said third and fourth registers to said first and second outgoing transmission lines, respectively.

6. The error correcting circuit of claim 5 wherein said receiving means comprises:
   fifth, sixth, seventh, and eighth n-bit registers, each said register comprising means for storing an n-bit data word;
   means coupled to said first and second incoming transmission lines for receiving two n-bit encrypted data words and for causing said first and second data words to be stored in said fifth and sixth registers, respectively;
   means for defining a one to one correspondence between the bits of said fifth and sixth registers and the bits of said seventh and eighth registers including means for transferring the data stored in each bit of said fifth and sixth registers to a corresponding bit in either said seventh or eighth register, wherein said correspondence is the inverse of the said correspondence between the bits of said first and second registers and the bits of said third and fourth registers;
   means for converting the words stored in said seventh and eighth registers to an n-bit data word using said cyclic error correcting code; and
   means for coupling said n-bit data word to said outgoing user line.

7. The error correcting circuit of claim 1 wherein said error correcting code comprises a transformation of a first error correcting code, said first error correcting code comprising an error correcting code for encrypting an n-bit data word into first and second code words, at least one of said first and second code words being 0 for at least one of the possible values of said n-bit data words, said transformation comprising a mapping of said first and second code words onto said first and second transmission encrypted words.

8. The error correcting circuit of claim 7 wherein said transformation comprises the successive application of first and second sub-transformations on said first and second code words, said first sub-transformation comprising exchanging the data in a first predetermined bit position of said first code word with the data in a second predetermined bit position in said second code and said second sub-transformation comprises complementing the data in one bit position in either said first or second code word.

9. The error correcting circuit of claim 7 wherein said transformation comprises the transformation shown in Table I.

* * * * *

UNITED STATES PATENT AND TRADEMARK OFFICE
CERTIFICATE OF CORRECTION

PATENT NO. : 4,899,340
DATED : February 6, 1990
INVENTOR(S) : Daniel P. Lubarsky It is certified that error appears in the above-identified patent and that said Letters Patent is hereby corrected as shown below:

Column 3, line 32, delete "eights" and insert therefor --eighth--.

Column 17, line 39, delete "8bits" and insert therefor --8 bits--.

Column 17, lines 59 and 60, delete "$2^1 6$ X 8-bit" and insert therefor --$2^{16}$ X 8-bit--.

Column 18, line 21, delete "1X and 2X" insert therefor --$^1$x and $^2$x--.

Column 2, line 3, "with" should be --which--

Column 3, line 42, delete "the" before "object".

Column 14, line 60, "$10^1$ $^8$" should be --$10^{18}$--

Column 20, line 56, delete "the" after

Signed and Sealed this

Twelfth Day of May, 1992

Attest:

DOUGLAS B. COMER

*Attesting Officer*  *Acting Commissioner of Patents and Trademarks*